United States Patent
Takahashi et al.

(10) Patent No.: US 8,817,295 B2
(45) Date of Patent: Aug. 26, 2014

(54) COMMUNICATION SYSTEM AND PRINTER THEREFOR

(75) Inventors: Yusaku Takahashi, Aichi (JP); Fumitoshi Uno, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 1207 days.

(21) Appl. No.: 11/889,793

(22) Filed: Aug. 16, 2007

(65) Prior Publication Data

US 2008/0055640 A1   Mar. 6, 2008

(30) Foreign Application Priority Data

Aug. 31, 2006 (JP) ................. 2006-234874
Aug. 31, 2006 (JP) ................. 2006-234875

(51) Int. Cl.
*G06F 3/12* (2006.01)
*G06K 15/22* (2006.01)
*G01R 31/08* (2006.01)
*G06F 3/00* (2006.01)
*G06F 15/177* (2006.01)

(52) U.S. Cl.
USPC ............ 358/1.15; 370/238; 358/1.13; 710/8; 709/221

(58) Field of Classification Search
USPC ................. 358/1.13, 1.15; 709/213, 221
See application file for complete search history.

(56) References Cited

U.S. PATENT DOCUMENTS

| | | | | |
|---|---|---|---|---|
| 7,227,656 | B1 * | 6/2007 | Kato | 358/1.15 |
| 2003/0048473 | A1 * | 3/2003 | Rosen | 358/1.15 |
| 2003/0084132 | A1 * | 5/2003 | Ohta | 709/221 |
| 2003/0128668 | A1 * | 7/2003 | Yavatkar et al. | 370/238 |
| 2003/0160989 | A1 * | 8/2003 | Chapin et al. | 358/1.13 |
| 2004/0024835 | A1 * | 2/2004 | Howard | 709/213 |
| 2004/0030810 | A1 * | 2/2004 | Lozano | 710/8 |
| 2005/0190399 | A1 | 9/2005 | Nakaoka et al. | |

FOREIGN PATENT DOCUMENTS

| | | |
|---|---|---|
| JP | 8-328427 | 12/1996 |
| JP | 11-296325 | 10/1999 |
| JP | 2001-125773 | 5/2001 |
| JP | 2002-296325 | 10/2002 |
| JP | 2003-122699 | 4/2003 |

(Continued)

OTHER PUBLICATIONS

Japanese Official Action dated Mar. 14, 2011 from related application No. 2006-234874.

*Primary Examiner* — Steven Kau
*Assistant Examiner* — Neil R McLean
(74) *Attorney, Agent, or Firm* — Scully, Scott, Murphy & Presser, P.C.

(57) ABSTRACT

A communication system includes a first network, a printer connected with the first network, a host device, connected with the first network, which are configured to use the printer as a network printer with a printer driver being installed therein, a second network connected with the first network via a router, and an external server device, connected with the second network, which is configured as a providing source of a first printer driver. The printer includes a downloading unit that downloads the first printer driver from the external server device via the first and second networks, a storing unit that stores the downloaded first printer driver, and a sending unit that sends the stored first printer driver to the host device via the first network. The host device includes a receiving unit that receives the first printer driver from the sending unit.

11 Claims, 20 Drawing Sheets

(56) References Cited

FOREIGN PATENT DOCUMENTS

| JP | 2003-131839 | 5/2003 |
| JP | 2004-70916 | 3/2004 |
| JP | 2004-259059 | 9/2004 |
| JP | 2005-63237 | 3/2005 |
| JP | 2005-209075 | 8/2005 |
| JP | 2005-219225 | 8/2005 |

* cited by examiner

The inserted memory card will be converted into a NW installer medium. The data in the memory card will completely be erased by this operation. Do you accept it?

1. YES    2. NO

IN EXECUTION OF CONVERSION INTO
NW INSTALLER MEDIUM

PRINT QUALITY CHECK SHEET

1. Please check print quality based on the below four printed patterns with their respective colors (black/cyan/yellow/magenta).
2. Please select "Yes" when all short lines are clearly printed. Otherwise, please select "No", and select a defective color in accordance with the message on the LCD display such that cleaning is performed therefor.

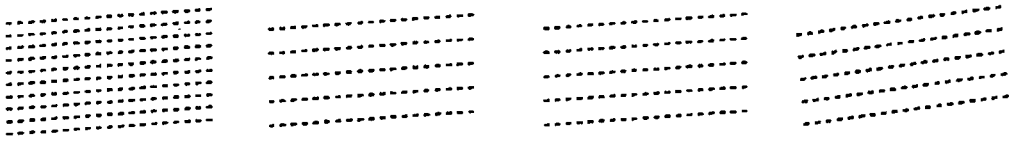

250

> Useful Information : How to use this printer as a printer or scanner from a PC
>
> ☆ In case of USB connection or parallel connection
>   Please install the printer driver from the attached CD-ROM with reference to the quick setup guide.
> ☆ In case of (wired or wireless) network connection
>   You can install the printer driver from the attached CD-ROM with reference to the quick setup guide in the same manner as the case of USB connection or parallel connection.
>   In addition to the above method, you can install the latest printer driver downloaded from the BROTHER web site into a "network installer memory card," into which a memory card with 256 MB or more is converted, even for the first download of the printer driver.
>   Detailed explanation can be printed by operations "photo capture button"-"help printing"-"network installer

FIG.17

COMMUNICATION SYSTEM AND PRINTER THEREFOR

CROSS-REFERENCE TO RELATED APPLICATION

This application claims priority under 35 U.S.C. §119 from Japanese Patent Applications No. 2006-234874 filed on Aug. 31, 2006, and No. 2006-234875 filed on Aug. 31, 2006. The entire subject matters of the applications are incorporated herein by reference.

BACKGROUND

1. Technical Field

The following description relates to one or more communication systems with a printer being connected to a host device such as a personal computer and workstation.

2. Related Art

When printing is performed based on printing data for printing images and texts transmitted to a printer from a host device such as a personal computer (PC), there is used a network printer system, which is configured to perform a printing operation with communication between the printer and host device in accordance with a protocol of a network via which the printer is connected with the host device (see Japanese Patent Provisional Publication No. HEI 11-296325, hereinafter referred to as '325 Publication). Such a network printer system is advantageous in that one or more printers can easily be shared among a plurality of host devices.

In '325 Publication, there is described a printer system with a printer being connected with host devices and a network server, which use the printer, via an internal network installed in an office or the like. In order for the host device to use the printer via the network, a printer driver for generating and sending printing data is required to be installed into the host device. In general, a printer driver is provided in a form stored in a printer driver disk such as a CD-ROM as a standard attachment at the time of purchase of a printer. In this case, a user has to install the printer driver of the printer to be used into a new host device from a CD-ROM drive provided to the new host device each time the new host device is connected to the network.

In '325 Publication, there is disclosed a technique in which a network server connected with the same internal network is utilized as a providing source of the printer driver. In the above technique, a new printer driver, which has been found through periodical accesses to the network server by the printer, is automatically installed. Thereby, the user is freed from the operation of installing the printer driver, yet the network server has to be provided on the internal network.

In '325 Publication, there is further disclosed a technique in which a printer driver is stored in a printer corresponding to the printer driver. In this case, when a new host device (PC) is connected to the network, the printer driver is downloaded from the printer and installed into the new host device via the internal network. According to the technique, since the printer serves as a network server, a new printer driver can be downloaded without any separate network server provided on the internal network.

However, in '325 Publication, there is not any detailed description about how the printer driver stored in the network server (or the printer as the network sever) can be updated.

Further, according to the technique disclosed in '325 Publication, when a plurality of host devices are connected with the internal network, there might be caused a problem that a printing operation of the printer cannot be performed due to a congested traffic of the internal network in the case where the plurality of host devices concurrently access the printer to download the printer driver.

SUMMARY

Aspects of the present invention are advantageous in that there can be provided one or more improved communication systems and printers therefor that allow host devices on an internal network to quickly acquire the latest version of printer driver and effectively prevent a congested traffic of the internal network caused by the printer driver being concurrently downloaded by a plurality of host devices without a network server provided as a providing source of the printer driver on the internal network.

According to aspects of the present invention, there is provided a communication system, which includes a first network, a printer connected with the first network, a host device connected with the first network, the host device being configured to use the printer as a network printer with a printer driver being installed therein, a router, a second network connected with the first network via the router, and an external server device connected with the second network, the external server device being configured as a providing source of a first printer driver for the printer. The printer includes a downloading unit configured to download the first printer driver from the external server device via the first network and the second network, a storing unit configured to store therein the first printer driver downloaded from the external server device, and a sending unit configured to send the first printer driver stored in the storing unit to the host device via the first network. The host device includes a receiving unit configured to receive the first printer driver from the sending unit of the printer.

Optionally, the first and second networks may be configured as TCP/IP-based networks.

Further optionally, the communication system may further include a version comparing unit configured to judge whether a version of the first printer driver stored in the storing unit is newer than that of a second printer driver already installed in the host device, and a transmission control unit configured to control the sending unit to send the first printer driver stored in the storing unit to the host device when it is judged by the version comparing unit that the version of the first printer driver is newer than that of the second printer driver already installed in the host device.

According to another aspect of the present invention, there is provided a printer usable as a network printer by a host device on a first network, which includes a downloading unit configured to download a first printer driver from an external server device on a second network connected with the first network, a storing unit configured to store therein the first printer driver downloaded from the external server device, and a sending unit configured to send the first printer driver stored in the storing unit to the host device via the first network.

According to some aspects, the printer can voluntarily access the external server device as a providing source of the first printer driver (the latest printer driver) therefor and download the latest printer driver via the first network (local area network) and the second network (external network). Therefore, the printer can acquire the latest printer driver from the external server device in real time and then install it to host devices promptly.

In addition, according to some aspects, the printer sends the latest printer driver to host devices judged that the version of the first printer driver is newer than that of the second printer driver already installed therein. Thereby, there can be alleviated a congested traffic of the first network in the case where a plurality of host devices concurrently access the printer to download the latest printer driver. Hence, for example, there can be prevented a problem that a printing operation of the printer cannot be performed due to such a congested traffic of the first network.

BRIEF DESCRIPTION OF THE ACCOMPANYING DRAWINGS

FIG. 1 schematically shows an overall configuration of a communication system in accordance with one or more aspects of the present invention.

Figure 4:
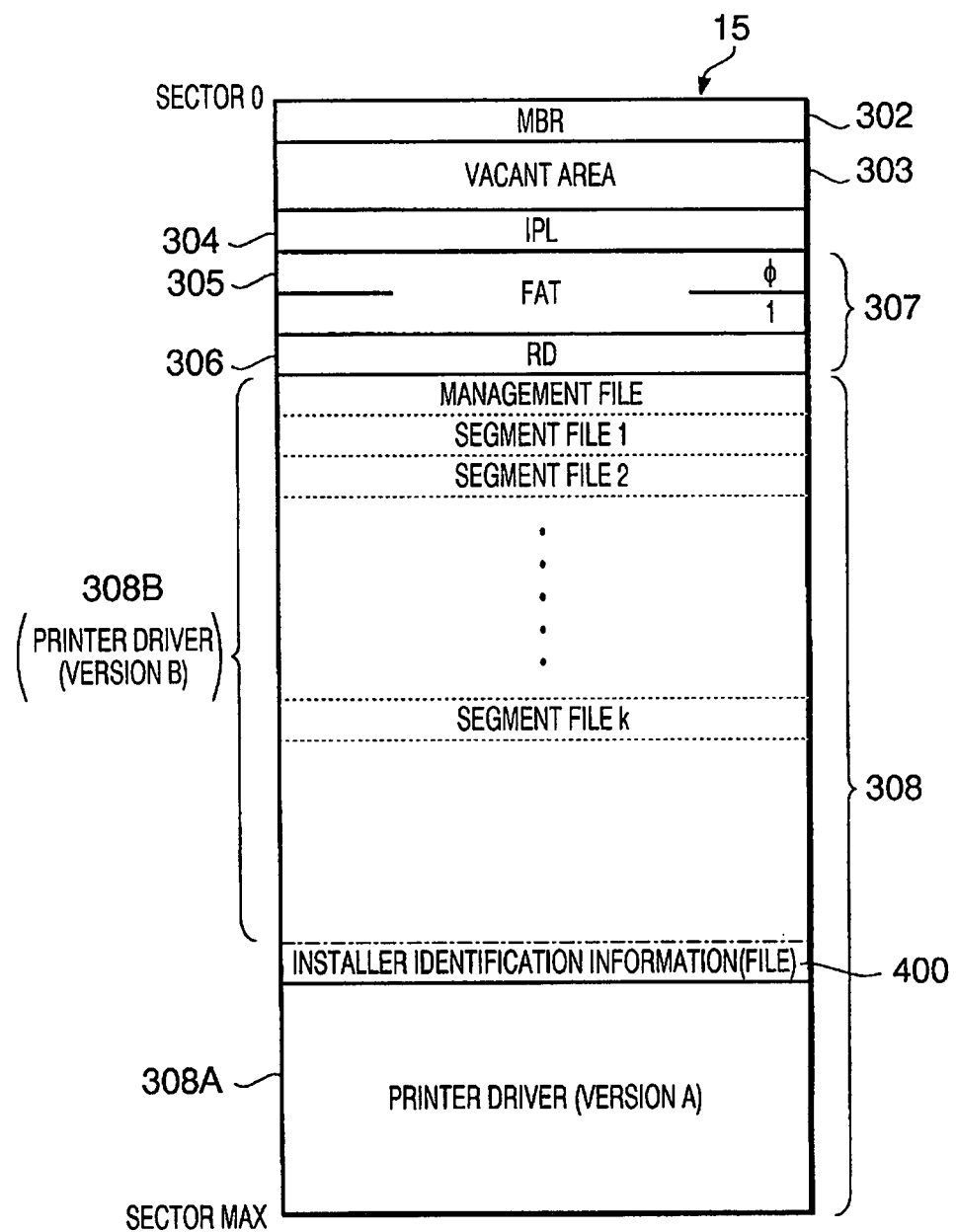

FIG. 4 schematically shows a sector structure of a memory card in accordance with one or more aspects of the present invention.

Figure 5:
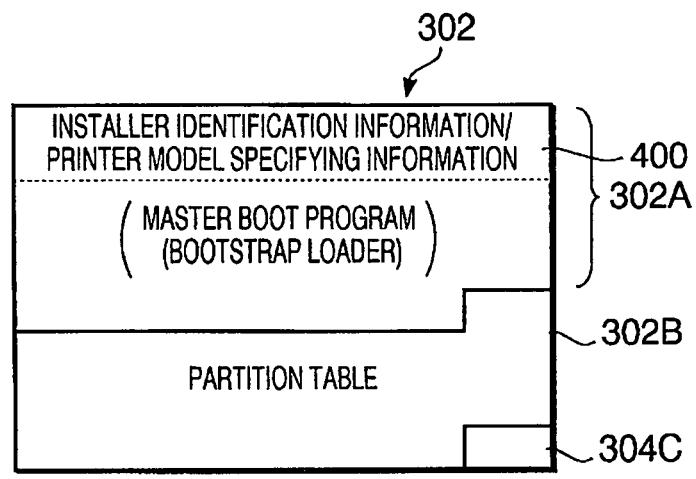

FIG. 5 schematically shows an example of a master boot record sector in accordance with one or more aspects of the present invention.

Figure 6:
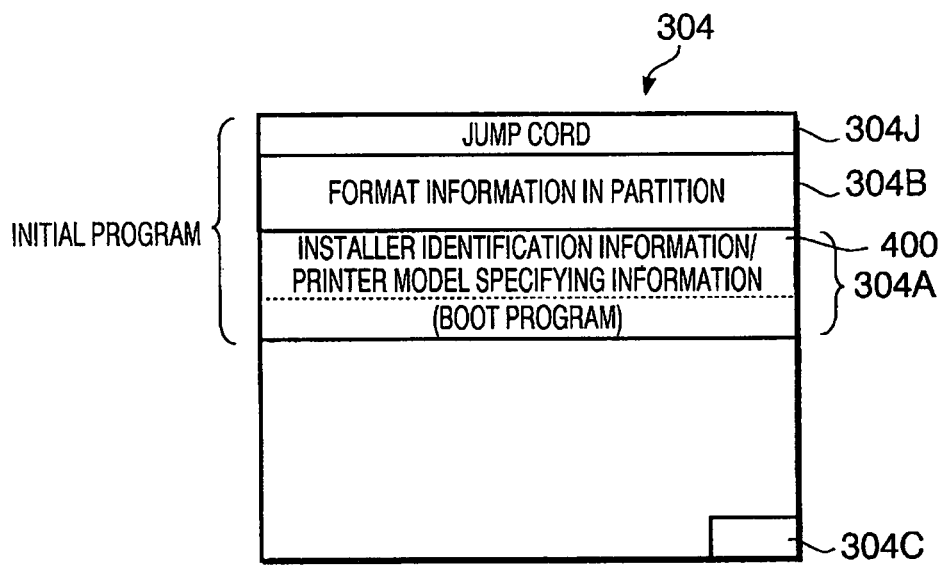

FIG. 6 schematically shows a sector for storing an initial program loader in accordance with one or more aspects of the present invention.

Figure 7:
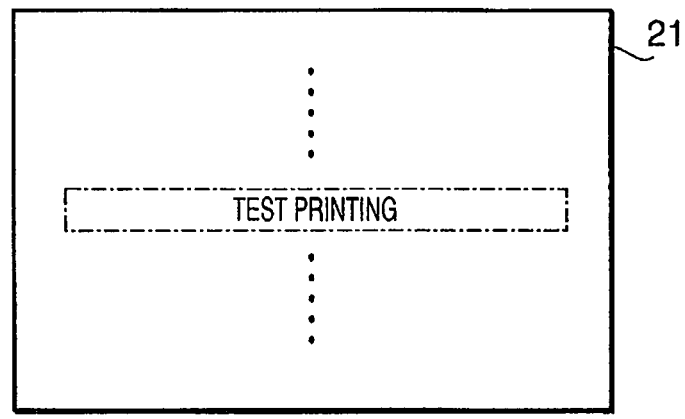

FIG. 7 is an example of a screen image displayed for a printing maintenance menu of the printer in accordance with one or more aspects of the present invention.

Figure 8:
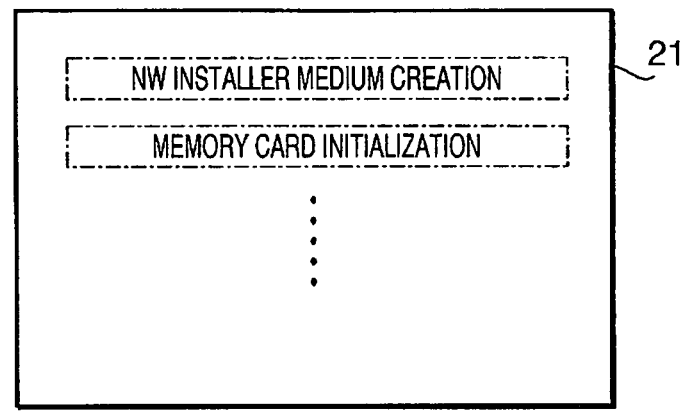

FIG. 8 is an example of a screen image displayed for a memory card management menu of the printer in accordance with one or more aspects of the present invention.

Figure 9:
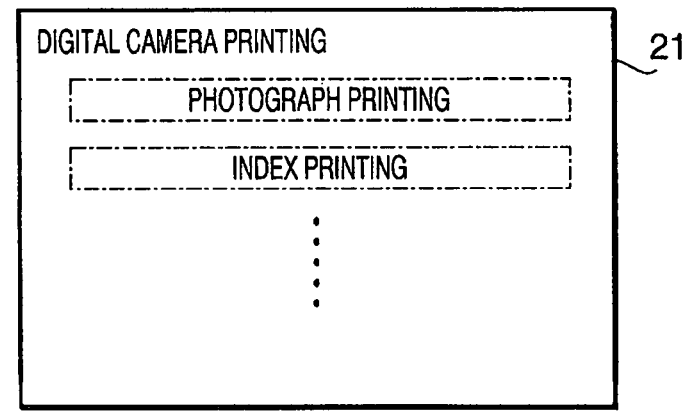

FIG. 9 is an example of a screen image displayed for a direct printing menu of the printer in accordance with one or more aspects of the present invention.

Figures 10, 11:
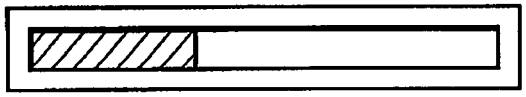

FIG. 10 is an example of a screen image displayed for determining whether to convert a memory card into a network installer medium in accordance with one or more aspects of the present invention.

FIG. 11 is an example of a screen image displayed while the memory card is converted into the network installer medium in accordance with one or more aspects of the present invention.

Figure 12:
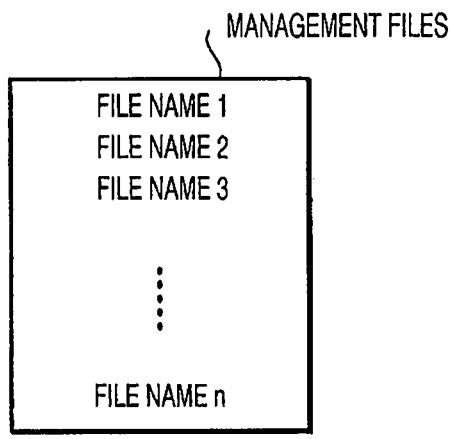

FIG. 12 schematically shows a management file in accordance with one or more aspects of the present invention.

Figure 13:
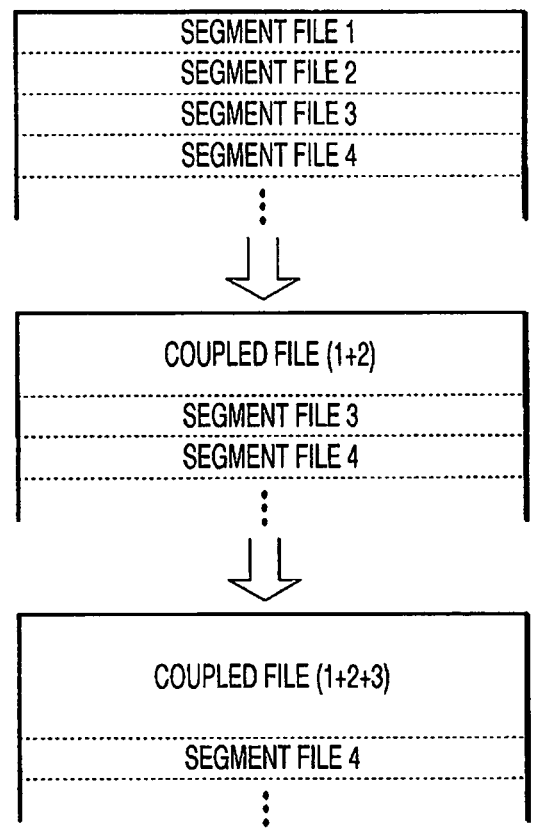

FIG. 13 schematically shows operations of coupling segment files in accordance with one or more aspects of the present invention.

Figure 14:
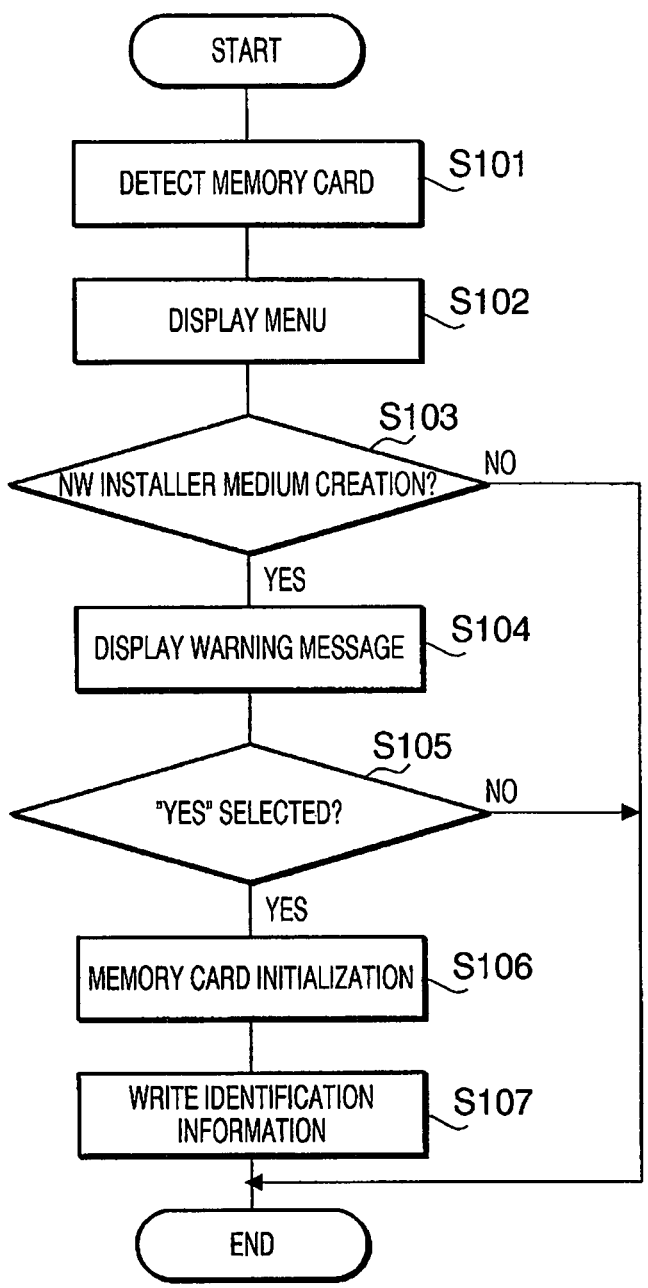

FIG. 14 is a flowchart showing a procedure of a process of creating the network installer medium in accordance with one or more aspects of the present invention.

Figure 15:
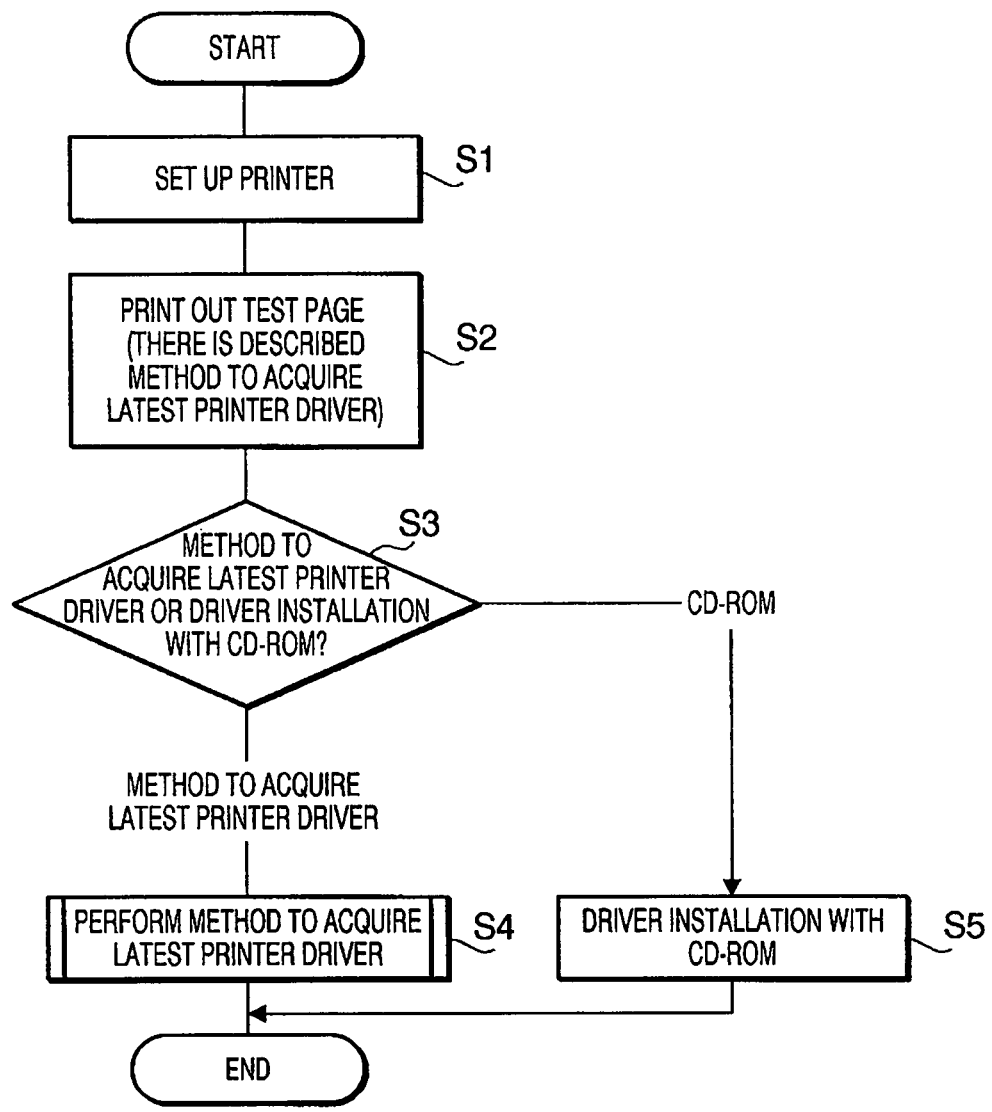

FIG. 15 is a flowchart showing a procedure of a process of installing a printer driver in a first embodiment according to one or more aspects of the present invention.

Figure 16:
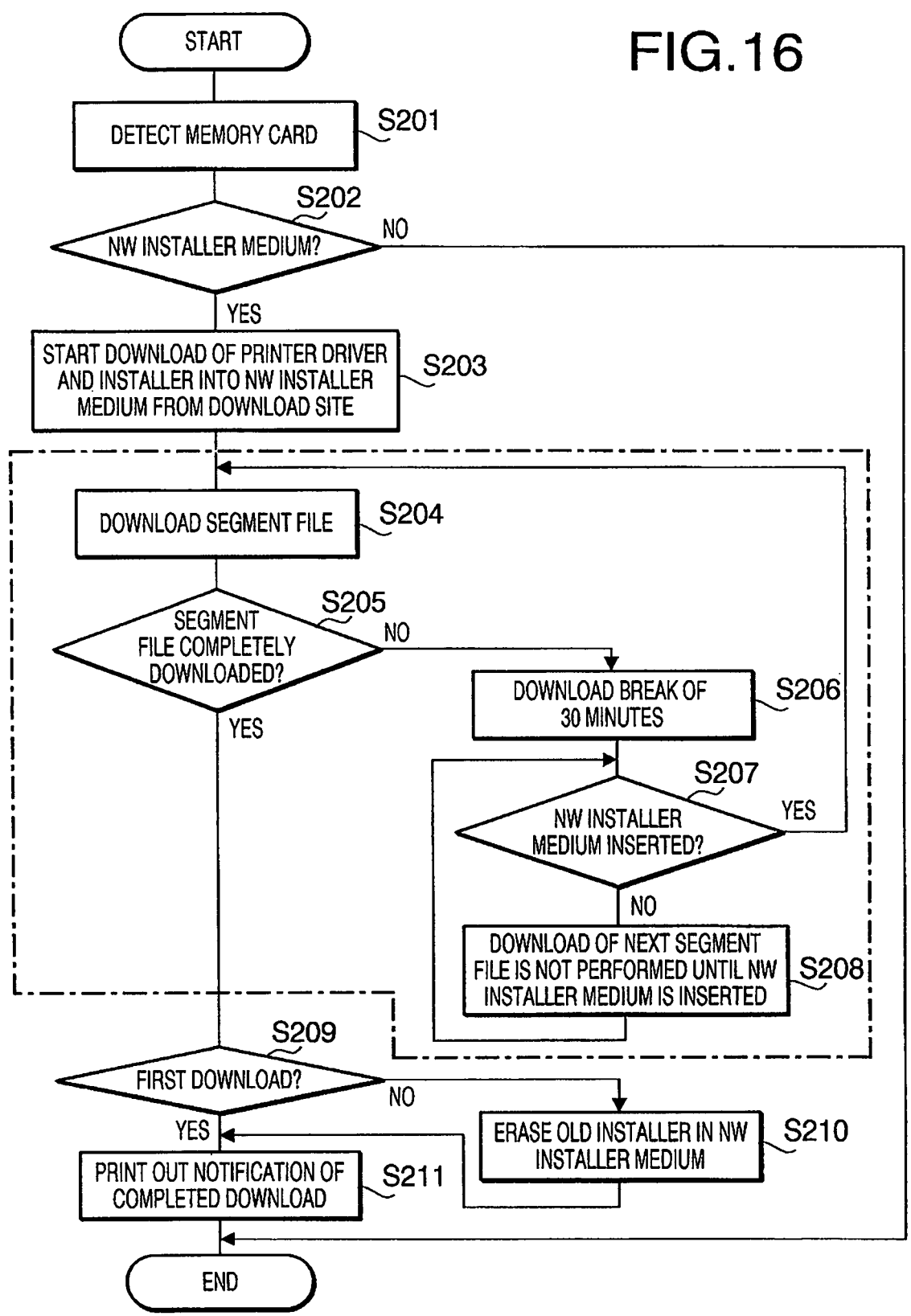

FIG. 16 is an example of a flowchart of a process of downloading the printer driver into the network installer medium in the first embodiment according to one or more aspects of the present invention.

FIG. 17 is an example of a printed result for test printing in the first embodiment according to one or more aspects of the present invention.

Figure 18:
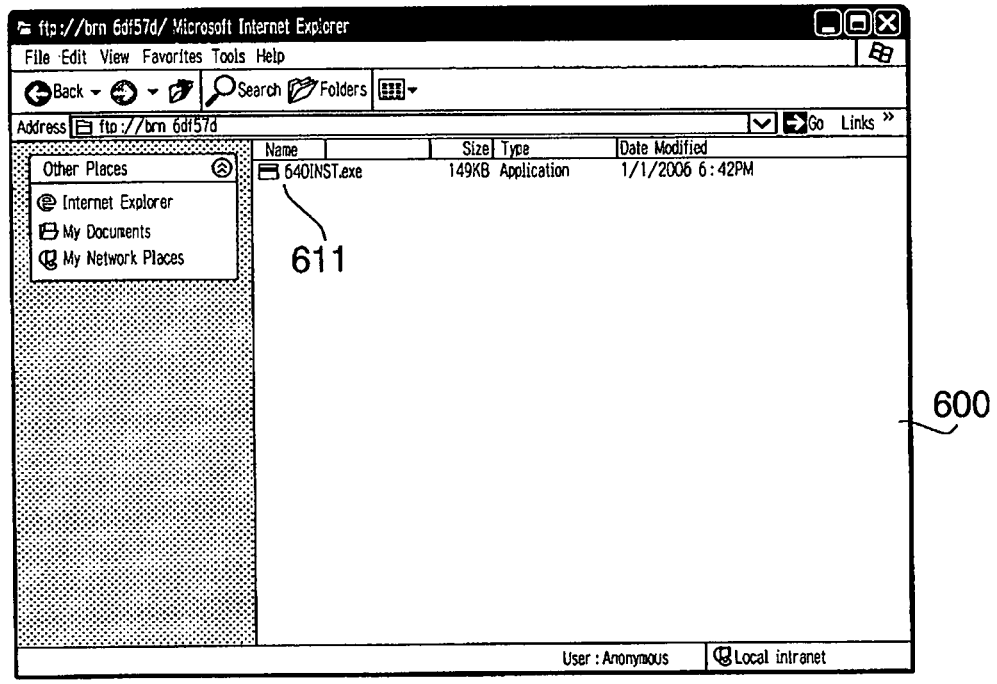

FIG. 18 is an example of a screen image displayed at a side of a PC when the process of downloading the printer driver using an FTP server function of the printer in the first embodiment according to one or more aspects of the present invention.

Figure 19:
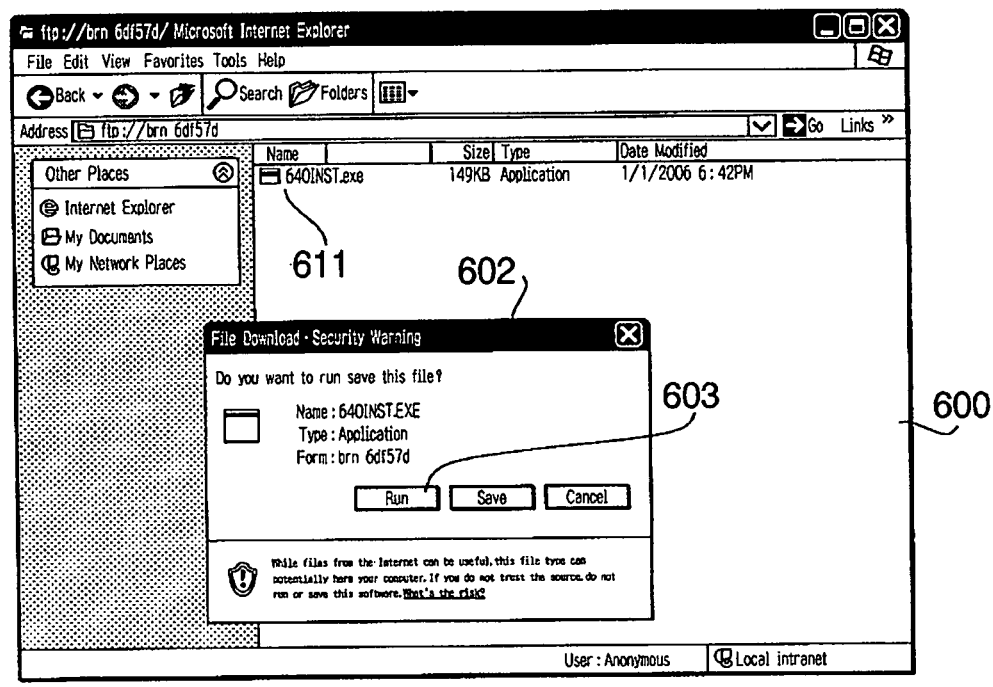

FIG. 19 is an example of a screen image displayed at the side of the PC, following FIG. 18, when the process of downloading the printer driver using the FTP server function of the printer in the first embodiment according to one or more aspects of the present invention.

Figure 20:
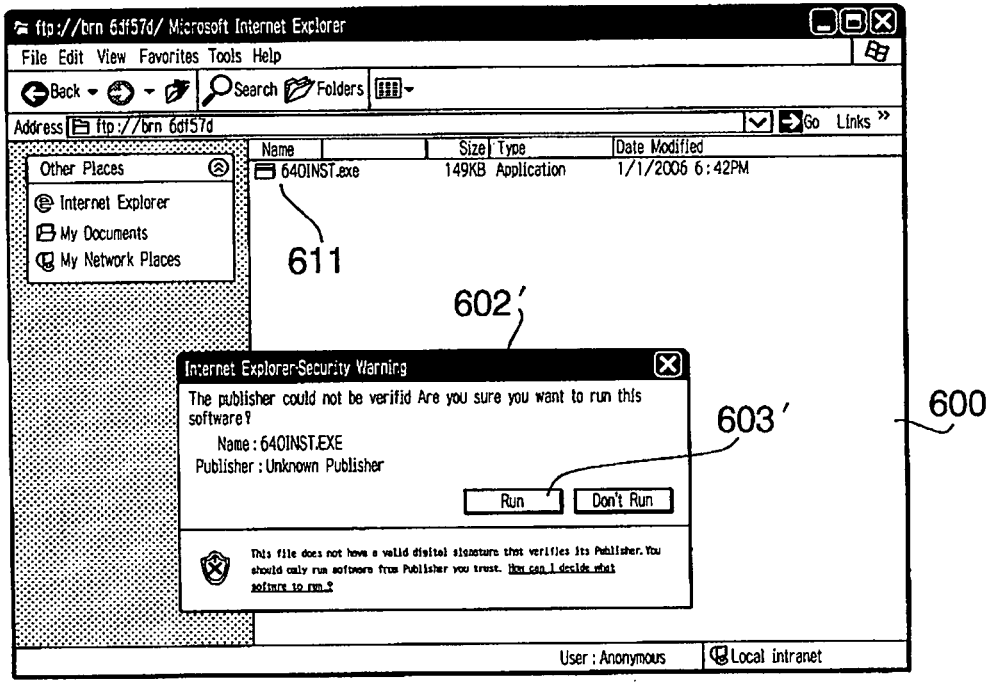

FIG. 20 is an example of a screen image displayed at the side of the PC, following FIG. 19, when the process of downloading the printer driver using the FTP server function of the printer in the first embodiment according to one or more aspects of the present invention.

Figure 21:
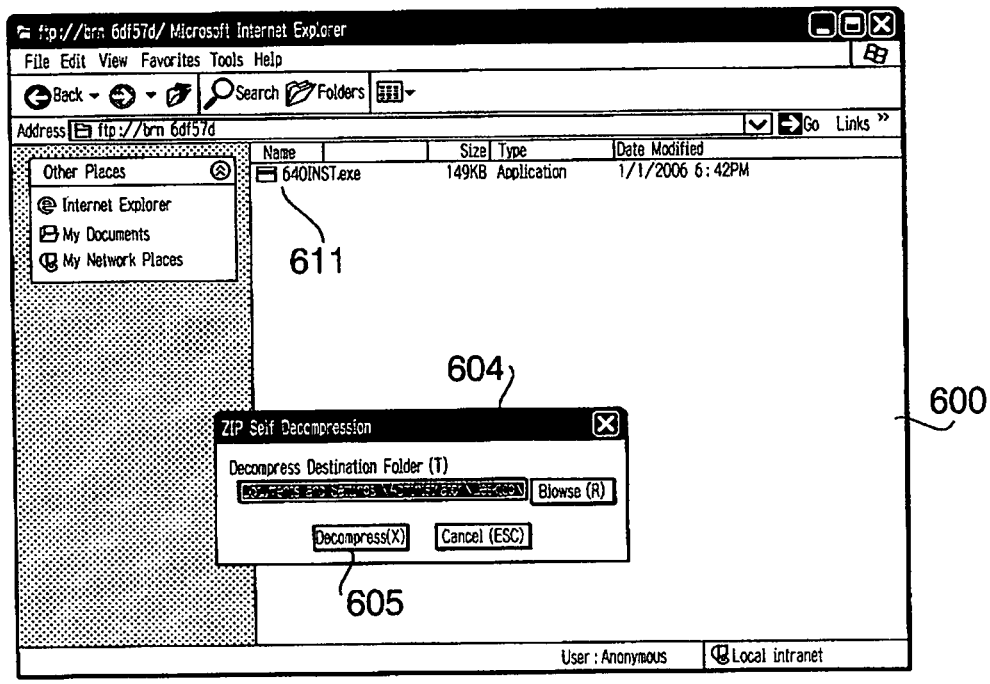

FIG. 21 is an example of a screen image displayed at the side of the PC, following FIG. 20, when the process of downloading the printer driver using the FTP server function of the printer in the first embodiment according to one or more aspects of the present invention.

Figure 22:
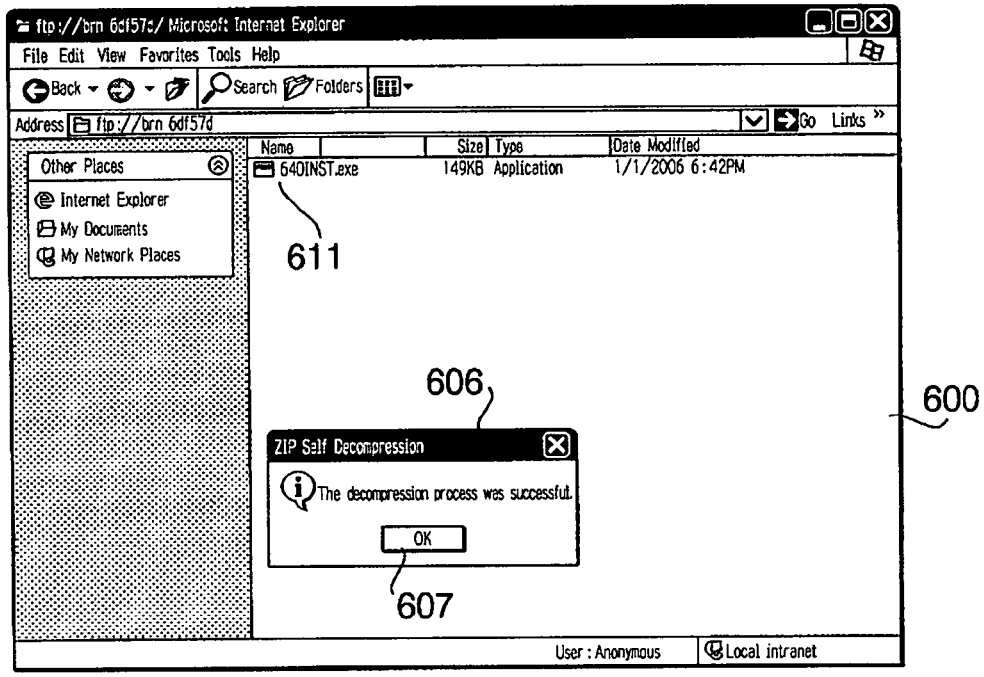

FIG. 22 is an example of a screen image displayed at the side of the PC, following FIG. 21, when the process of downloading the printer driver using the FTP server function of the printer in the first embodiment according to one or more aspects of the present invention.

Figure 23:
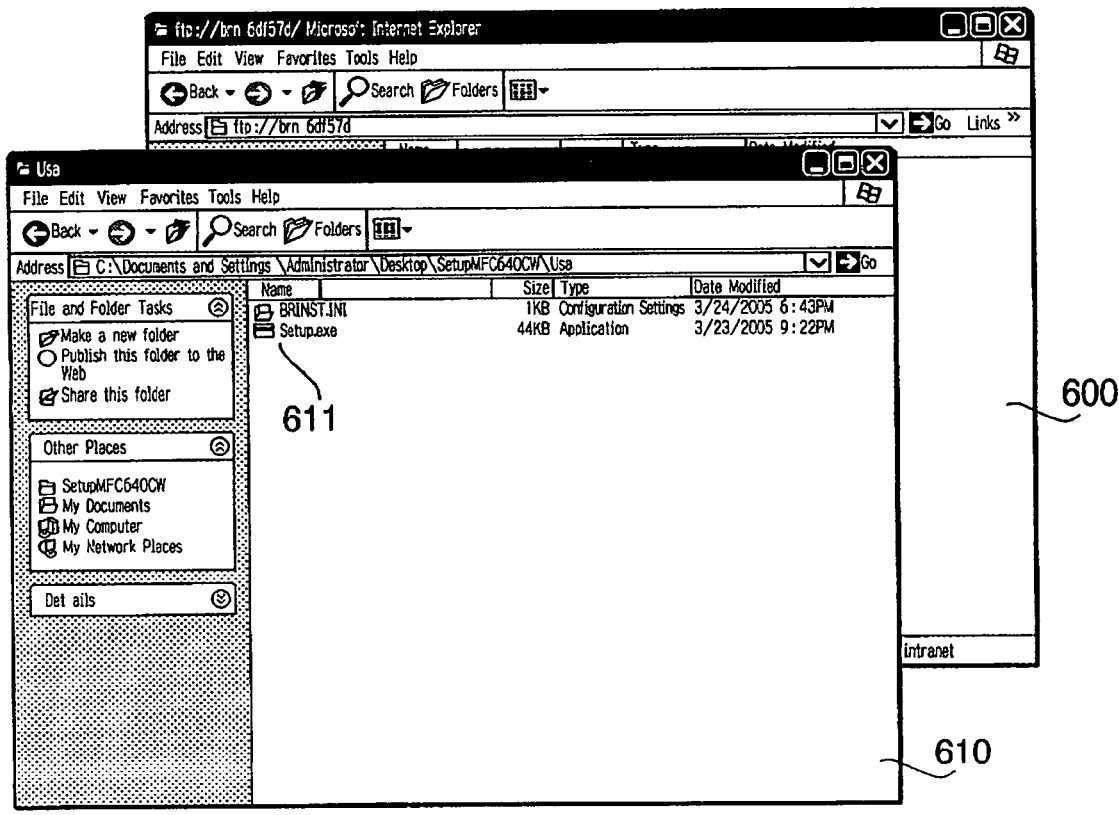

FIG. 23 is an example of a screen image displayed at the side of the PC, following FIG. 22, when the process of downloading the printer driver using the FTP server function of the printer in the first embodiment according to one or more aspects of the present invention.

Figure 24:
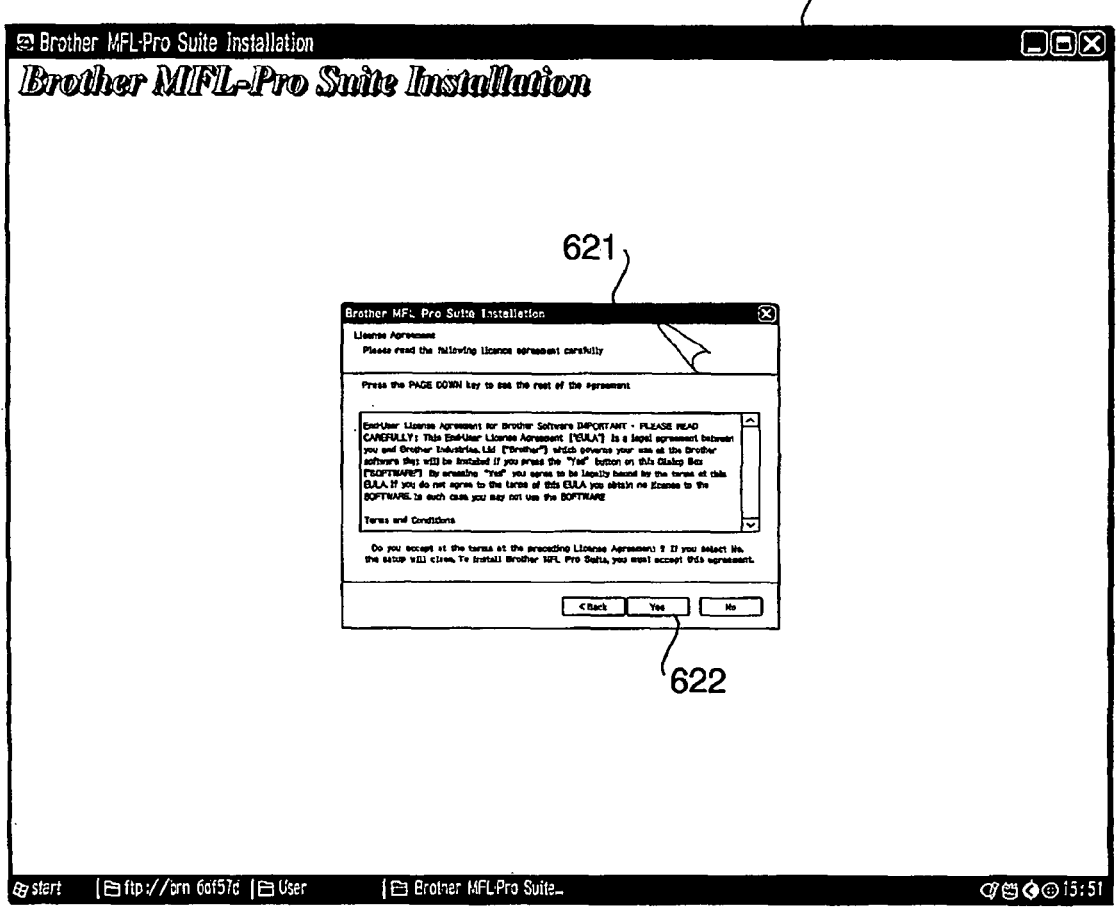

FIG. 24 is an example of a screen image displayed at the side of the PC, following FIG. 23, when the process of downloading the printer driver using the FTP server function of the printer in the first embodiment according to one or more aspects of the present invention.

Figure 25:
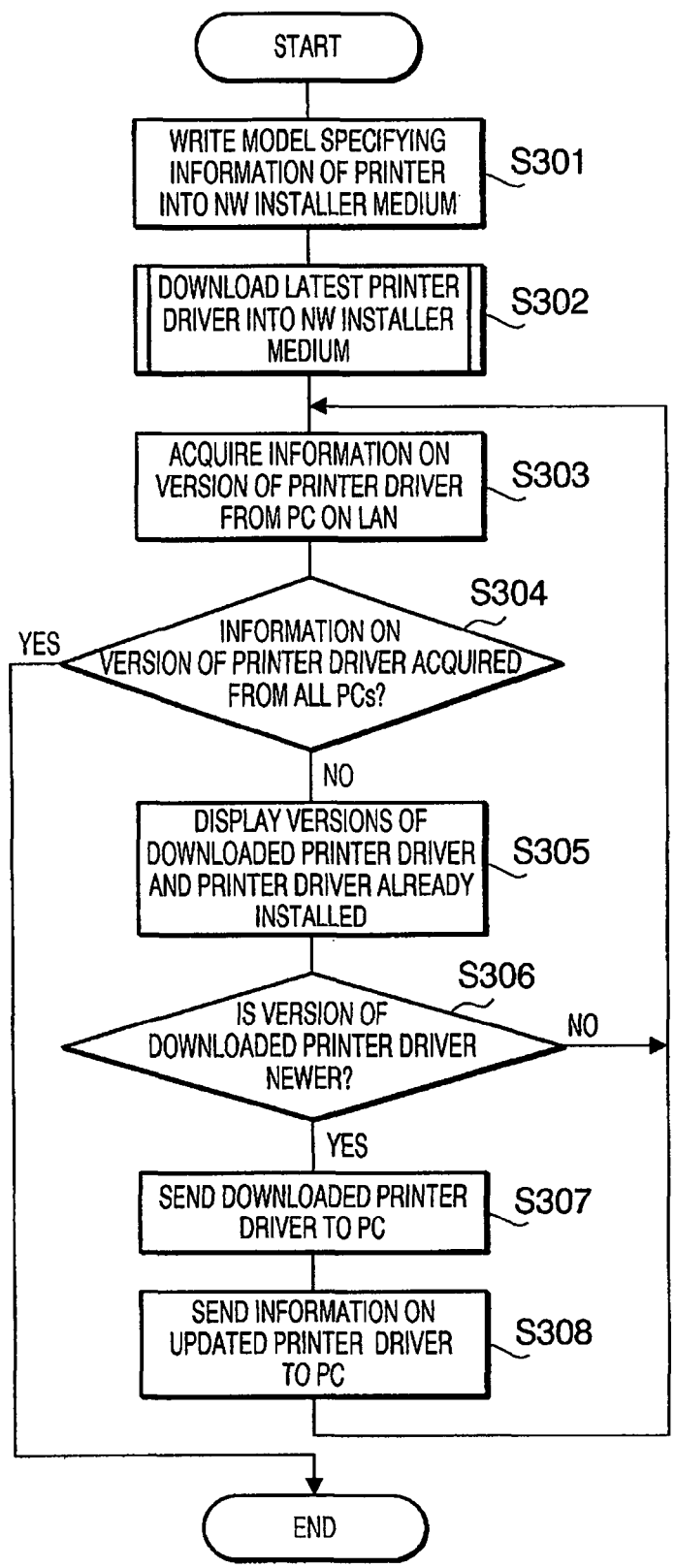

FIG. 25 is a flowchart showing a procedure of a process to be executed at the side of the printer that is related to printer driver updating in a second embodiment according to one or more aspects of the present invention.

Figure 26:
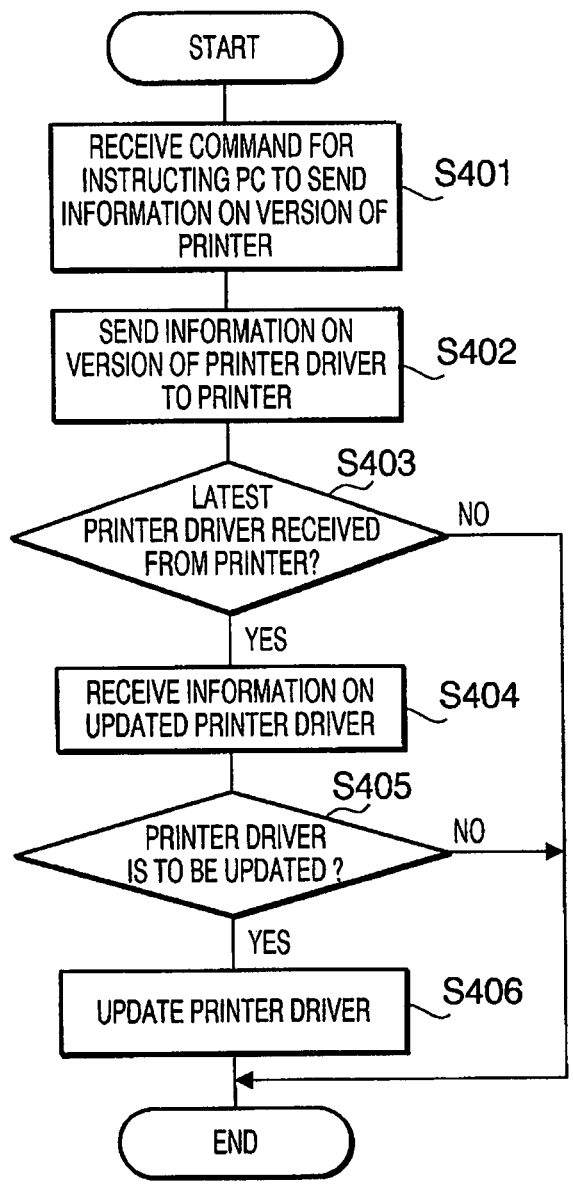

FIG. 26 is a flowchart showing a procedure of a process to be executed at the side of the PC as a counterpart of the process shown in FIG. 25 in the second embodiment according to one or more aspects of the present invention.

Figure 27:
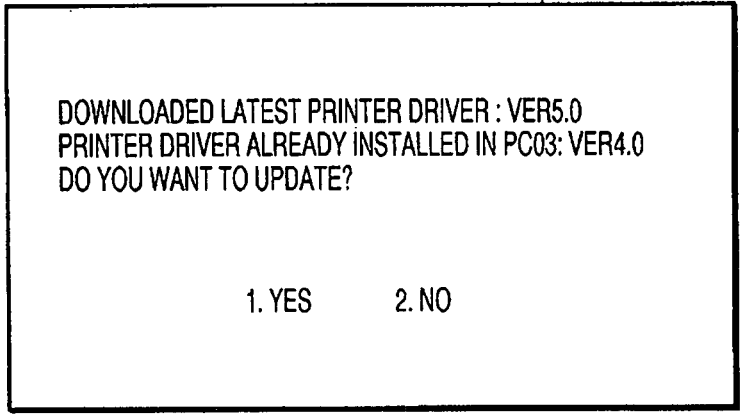

FIG. 27 is an example of a screen image displayed at the side of the printer for confirming whether to update a printer driver being installed in the PC in the second embodiment according to one or more aspects of the present invention.

Figure 28:
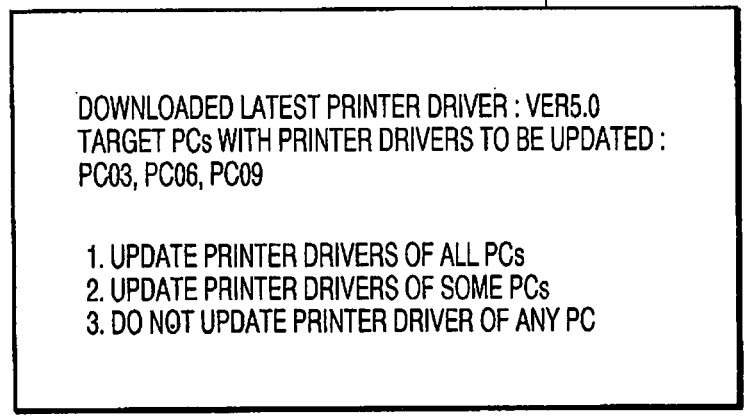

FIG. 28 is another example of the screen image displayed at the side of the printer for confirming whether to update the printer driver being installed in the PC in the second embodiment according to one or more aspects of the present invention.

Figure 29:
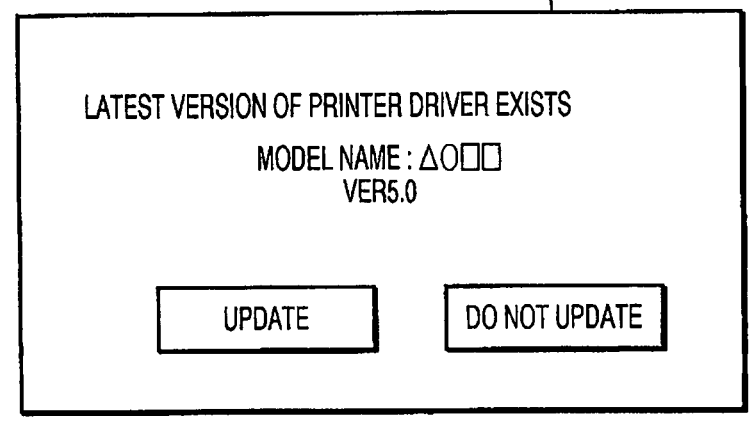

FIG. 29 is an example of a screen image displayed at the side of the PC for confirming whether to update the printer driver being installed therein in the second embodiment according to one or more aspects of the present invention.

Figure 30:
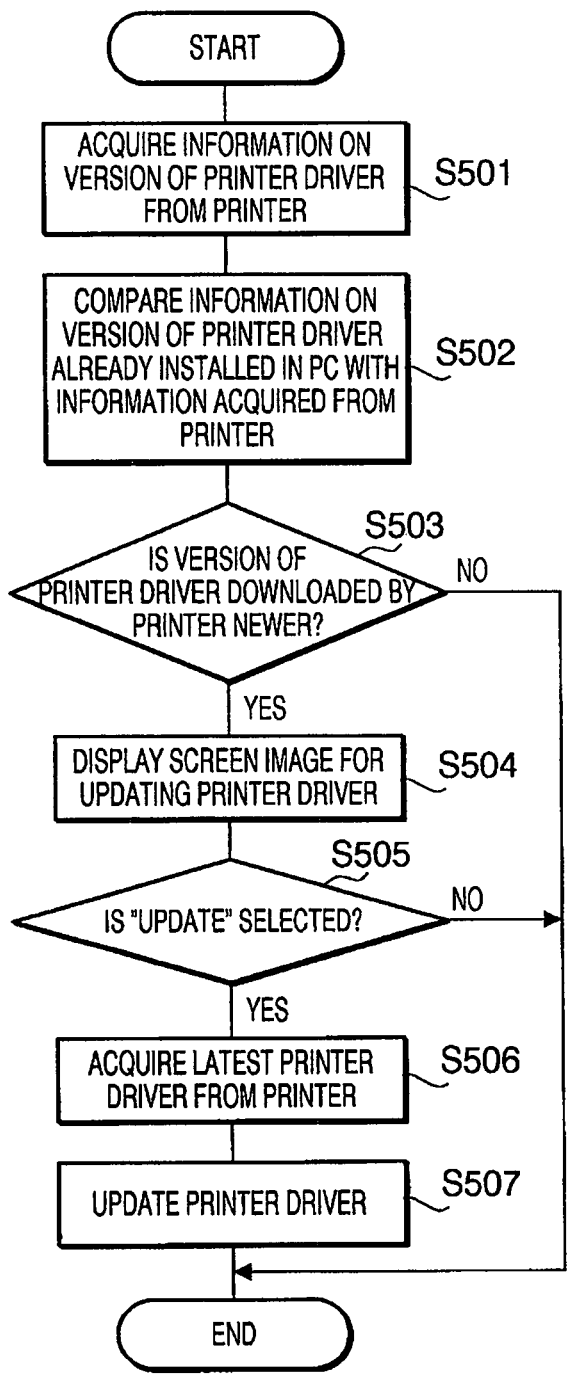

FIG. 30 is a flowchart showing a procedure of a process to be executed at the side of the PC that is related to the printer driver updating in a modification according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Figure 1:
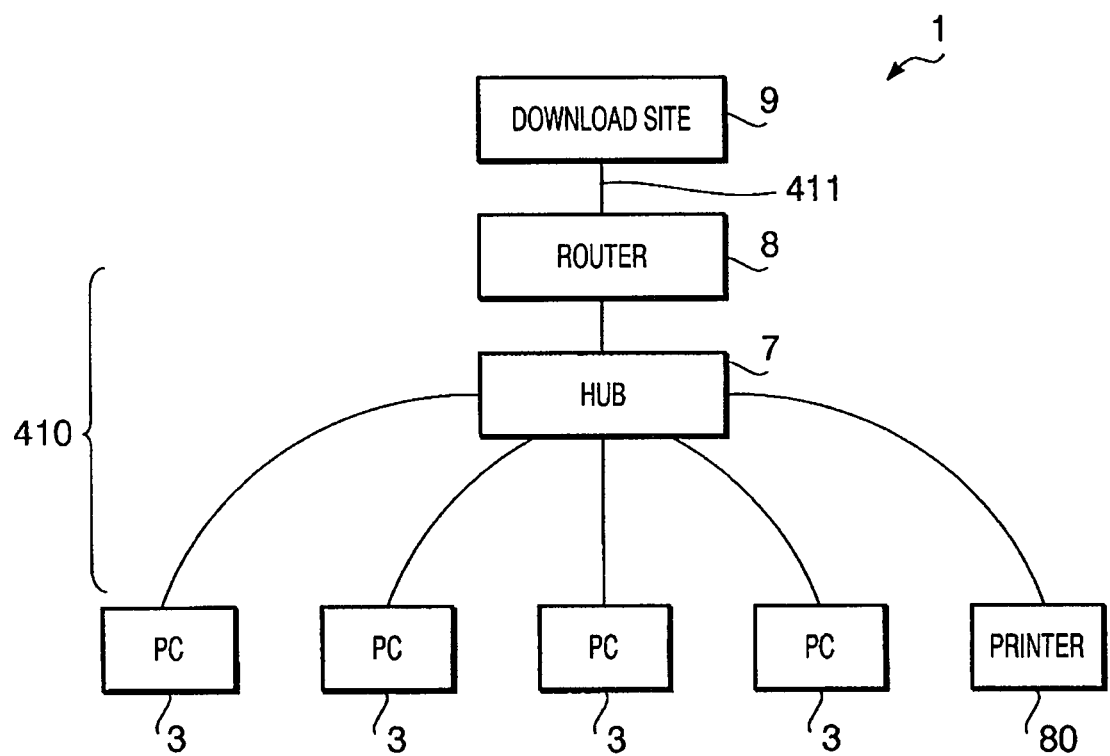

Hereinafter, embodiments according to aspects of the present invention will be described with reference to the accompanying drawings. FIG. 1 is a block diagram schematically showing a configuration of a communication system 1 in a first embodiment. The communication system 1 is provided with a first network 410, a second network 411, and an external server device 9. The first network 410 is configured as a local area network based on a TCP/IP protocol via which a printer 80 is connected with host devices 3 (personal computers: hereinafter referred to as "PCs") which uses the printer 80 as a network printer. The second network 411 is configured as an external network based on the TCP/IP protocol that is connected with the first network 410 via a router 8. The external server device 9 is connected with the second network 411 as a providing source of a printer driver.

The router 8 is provided between the first network 410 and the second network 411 so as to relay bidirectional transmission of communication packets therebetween. The first network 410 is established as a private network inside a facility at a side of a user of the printer 80. Meanwhile, the second network 411, connected with the first network 410 via the router 8, is an external network (in the first embodiment, Internet) of a larger scale than the first network 410 based on the assumption of accesses by general public. In addition, the external server device 9 (referred to as a download site in FIG. 1) is, for example, an internet server managed by a maker of the printer 80 as a download source (providing source) of the printer driver.

In order to use the printer 80 from the PCs 3 via the first network 410, the printer driver for generating printing data and sending the generated printing data to the printer 80 has to be installed into each of the PCs 3. In the communication system 1 of the first embodiment, the printer 80 is provided with a plurality of functions actualized by below-mentioned programs. The functions include:

a first function (TCP/IP client function) of communicating with the external server device 9 as a TCP/IP client;

a second function of accessing the external server device 9 via the first network 410, router 8, and second network 411 with the first function, downloading the printer driver, and storing the downloaded printer driver in a below-mentioned network (NW) installer medium 15;

a third function (TCP/IP server function) of communicating with the PCs 3 as a TCP/IP server; and a fourth function of sending the printer driver stored in the below-mentioned NW installer medium 15 to the PCs 3 via the first network 410 with the third function.

In addition to the first to fourth functions, in the communication system 1 of a below-mentioned second embodiment, the printer 80 may be provided with further functions actualized by below-mentioned programs. The further functions include:

a fifth function of receiving information on versions of printer drivers installed in the plurality of PCs (host devices) 3 therefrom, respectively via the first network; and a sixth function of comparing information on a version of the printer driver stored in the NW installer medium 15 with the information on the versions of the printer drivers that has received from the plurality of PCs (host devices) 3.

The aforementioned fourth function may be adapted to be a function of sending the printer driver stored in the NW installer medium 15 only to PCs 3, in which printer drivers as stored are ones of older versions than the printer driver stored in the NW installer medium 15, with the third function via the first network 410.

Figure 2:
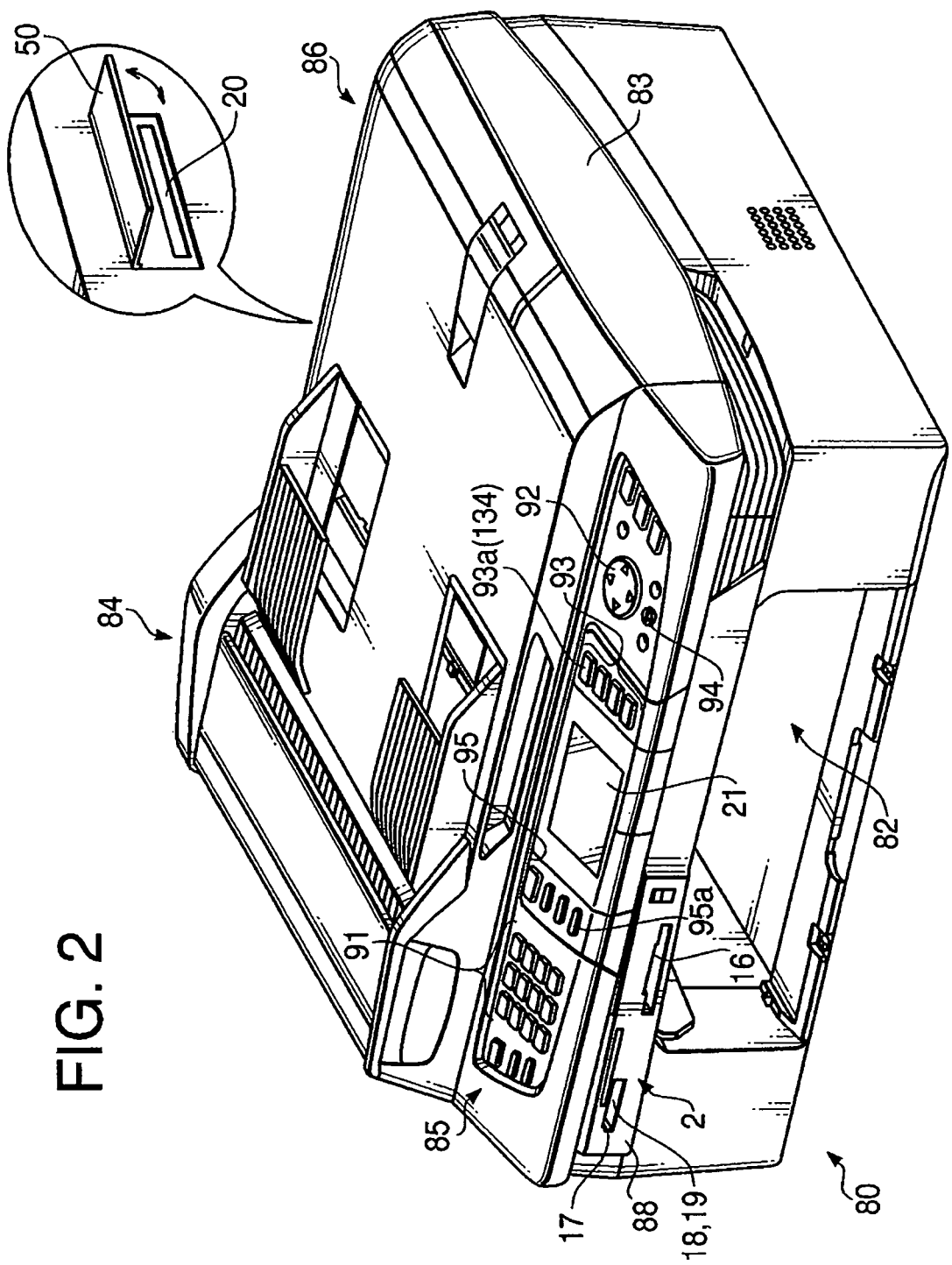
FIG. 2 is a perspective view showing an example of a printer applied to the communication system in accordance with one or more aspects of the present invention.

FIG. 2 schematically shows an external configuration of the printer 80. The printer 80 is configured as a Multi Function Peripheral (MFP). Specifically, the printer 80 is integrally provided with a printing unit 82 arranged at a lower portion of a housing, scanner unit 83 arranged at an upper portion of the housing, cover 86 having a document feeder 84, operation panel 85 arranged at a front side on an upper surface of the printer 80, and multi card reader/writer 2 with slots 16 to 19 into which card media are inserted at a front of the printer 80. The printer 80 has a printer function, scanner function, copier function, and facsimile function.

The printer 80 prints an image and/or text onto a paper with the printing unit 82 based on printing data, including image data and/or text data, to be transmitted by the PC 3. In addition, the printing unit 82 can also print an image and/or text onto a paper based on printing data read out from a memory card (removable recording medium) by the multi card reader/writer 2 (direct printing). Further, the printer 80, connected with the PC 3, can serve as a reader/writer device that performs data communication between the PC 3 and a memory card inserted into the multi card reader/writer 2. Additionally, the printer 80 can send data of an image scanned by the scanner unit 83 to the PC 3 and copy the scanned image with the printing unit 82.

As shown in FIG. 2, the multi card reader/writer 2 of the printer 80 is provided with a first slot 16 into which a first memory card 11 is inserted, a second slot 17 into which a second memory card 12 is inserted, a third slot 18 into which a third memory card 13 is inserted, and a fourth slot 19 into which a fourth memory card 14 is inserted. In addition, at a front of the housing, there are provided a liquid crystal display panel (LCD) 21 as a display unit, keyboard 91 including a numeric keypad, and cursor key 92 for controlling a cursor motion on the LCD 21. Furthermore, various menu keys 93 and 95 are arranged at locations adjacent to the LCD 21. The multi card reader/writer 2 is configured as a USB/SCSI type peripheral device.

Figure 3:
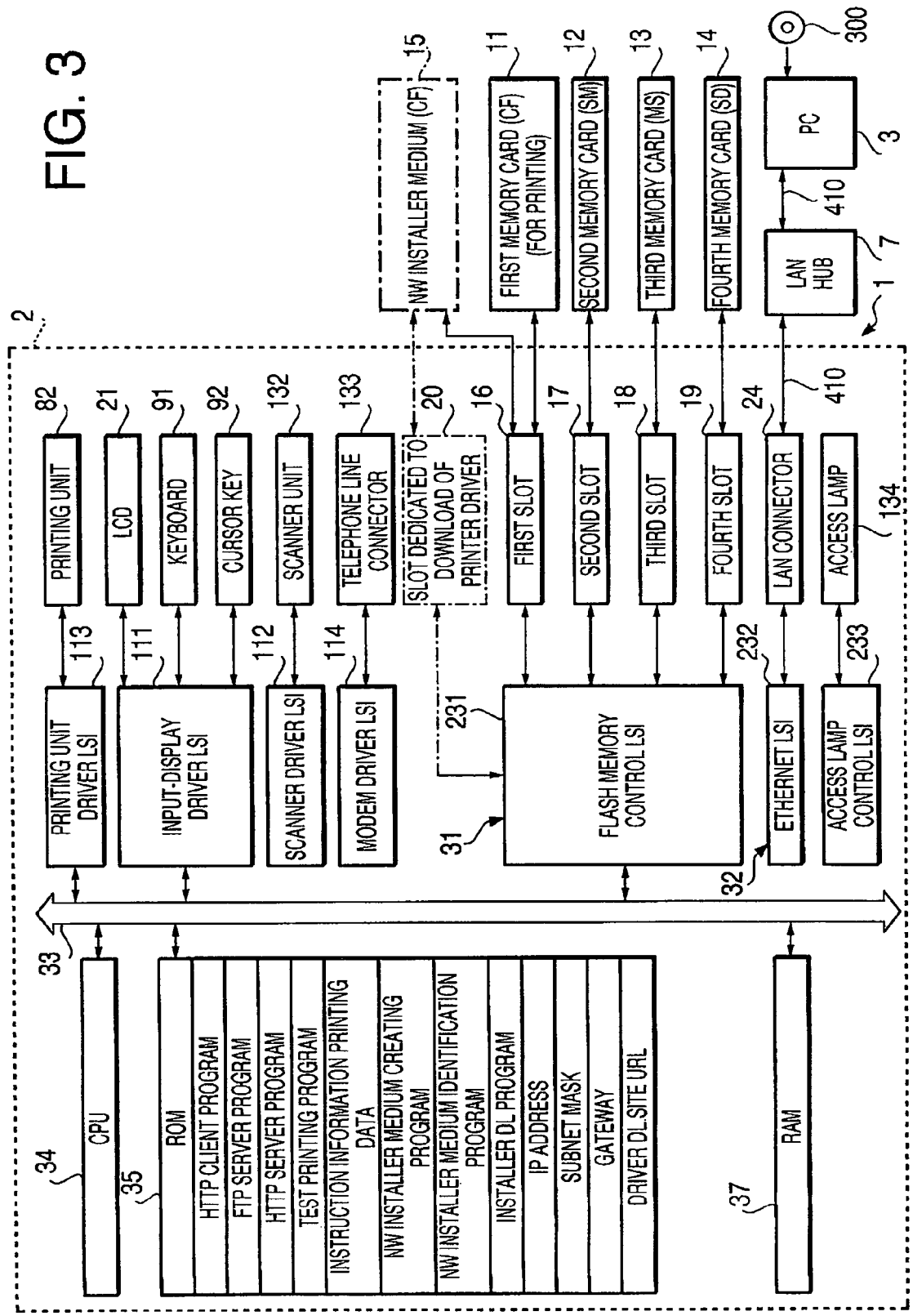
FIG. 3 is a block diagram showing an example of an electrical configuration of the printer in accordance with one or more aspects of the present invention.

FIG. 3 is a block diagram showing an electrical configuration of the printer 80. The multi card reader/writer 2 includes therein a CPU 34 that controls each component, ROM 35 (configured as a non-volatile memory such as a flash memory in the first embodiment) which stores therein various control programs and data, and RAM 37 as a work area for an operation by the CPU 34, which are interconnected so as to mutually perform data transmission via a bus 33. Further, the bus 33 is connected with each of the slots 16 to 19 via a flash memory control LSI 231. The first to fourth memory cards 11 to 14, detachably inserted into the slots 16 to 19, respectively, are card type recording media that include flash memories to which the PC 3 can perform data access such as data writing, data rewriting, data erasing, data reading, and medium loading confirmation. The first to fourth memory cards 11 to 14 are, for example, a CompactFlash (CF: trademark registered, the first memory card 11), SmartMedia (SM: trademark registered, the second memory card 12), Memory Stick (MS: trademark registered, the third memory card), and SD Memory Card (SD: trademark registered, the fourth memory card 14).

The bus 33 is connected with the printing unit 82 via a printing unit driver LSI 113. Further, the bus 33 is connected with the scanner unit 132 via a scanner driver LSI 112. Additionally, the bus 33 is connected with a modem driver LSI 114, which is linked with telephone line connector 133 to be connected with an external telephone communication network. The bus 33 is connected with the LCD 21, keyboard 91, and cursor key 92 via an input-display LSI 111. The bus 33 is connected with an access lamp 134 via an access lamp control LSI 233. Furthermore, the bus 33 is connected with the plurality of PCs 3 as the host devices via an Ethernet (Ethernet: trademark registered) LSI 232, local area network connector 24, and the first network 410. The plurality of PCs 3 and the printer 80 are interconnected on the first network 410 via the hub 7 (see FIG. 1).

There are stored in the ROM 35 various programs for controlling an operation of the printing unit 82, controlling an operation of the scanner unit 132, controlling facsimile communication via the modem driver LSI 114, controlling an input from an input portion such as the keyboard 91 and cursor key 92 (in addition, the menu keys 93 and 95, and an execution key 94 that are not shown in any drawing), controlling a display output on the LCD 21, and controlling an operation of the multi card reader/writer 2. By running the above programs on the RAM 37 as an execution area, the CPU 34 controls an overall operation of the printer 80 as the MFP. It is noted that the above programs are not shown since they are widely known.

In addition, there are stored in the ROM 35 various programs that actualize TCP/IP protocol engine for communicating with other server devices including the external server 9 and client devices including the PCs 3 via the first network (local area network) 410 and second network (Internet) 411. The above programs include a plurality of programs for actualizing the aforementioned first to fourth functions. The programs include:

an http client program that allows the printer 80 to access, as an http client, http server devices (sites specified by URLs) on a TCP/IP network;

an installer download (DL) program that is a kind of site browser program for accessing a fixed URL on the external server device 9 from which the printer driver can be downloaded, the program allowing the printer 80 to download a compressed printer driver file and program executable file (installer program) for decompressing the printer driver file and installing it into the PC 3 into the below-mentioned network installer media from the fixed site via the second network 411, router 8, and first network 410;

an FTP server program that allows the printer 80 to send a specified file to the FTP (File Transfer Protocol) client devices on the TCP/IP network (and run the specified file when it is a program executable file such as files with an extension ".exe" for MS-DOS, Windows (trademark registered), and Windows NT (trademark registered)), as an FTP server; and the aforementioned installer program (self-extracting executable file) stored in the NW installer medium 15 that is run from the side of the PC 3 via the first network 410 and causes the printer 80 to decompress the printer driver file required for using the printer 80, and send and install the file into the PC 3 in cooperation with the aforementioned FTP server program.

Furthermore, there are stored in the ROM 35 an IP address and subnet mask for specifying the printer 80 on the TCP/IP network including the first network 410 and second network 411 and a gateway for specifying the router 8 as a gate to the second network 411.

There is bundled to the printer 80 a printer driver installation disk 300 configured, for example, as a CD-ROM so as to store thereon a printer driver and an installer program for the printer driver and be readable by the PCs (host devices) 3. What is downloaded from the external server device 9 is a later version of printer driver (and a corresponding installer program) than the printer driver (and installer program) stored on the printer driver installation disk 300. The new version of printer driver as downloaded is installed into PCs (host devices) 3 without any printer driver being installed therein. It is noted that the bundled printer driver installation disk 300 is not reliable as a providing source of the latest printer driver, yet can be used for printer driver installation in an emergency case or in an off-line environment where an intended device is not connected with an external network.

There are inserted into the slots 16 to 19 the memory cards (removable recording media) 11 to 14 that store therein files for printing, respectively. The slots 16 to 19 are utilized as slots for direct printing to read out the files for printing from the memory cards 11 to 14, respectively, and to directly perform image printing based on the files for printing with the printing unit 82. For example, in the case of a digital camera, a picture image taken by the digital camera is stored as a JPEG image file in a specific kind of memory card inserted into a card reader of the digital camera. Then, the memory card is removed and inserted into a corresponding one of the slots 16 to 19 of the printer 80. Thereafter, when an option "direct printing" in a menu is selected on the LCD 21 by operating the keyboard 91, cursor key 92, or menu keys 93 and 95, the direct printing can be performed for a selected picture image file.

In the first embodiment, so as to simplify a configuration of printer hardware, the aforementioned four slots 16 to 19 for the direct printing are also used as download slots into which the NW installer medium 15 is inserted to download the printer driver. In this case, all kinds of memory cards (CF, SM, MS, SD) usable by the printer 80 may be employed as the NW installer medium 15. Further, some kinds of memory cards may be employed as the NW installer medium 15. In the first embodiment, there is shown an example where the CF (CompactFlash) is used as the NW installer medium 15.

There is written in a fixed area of a memory card employed as the NW installer medium 15 installer identification information for identifying the memory card as the NW installer medium 15. A network (NW) installer medium identification program is stored in the ROM 35 of the printer 80. The CPU 34 executes the program to access the fixed area of the memory card. Then, when valid installer identification information is written in the fixed area, download of the printer driver with the installer DL program is permitted. Meanwhile, when valid installer identification information is not written in the fixed area, download of the printer driver with the installer DL program is forbidden. The memory card, in which the installer identification information is written, can be identified as the NW installer medium by the printer 80. In an unlikely case where another unintended memory card is attached to the printer 80 as the NW installer medium 15, the printer driver is not mistakenly downloaded into the unintended memory card.

Additionally, in the below-mentioned second embodiment, there may be written in the NW installer medium 15, as well as the aforementioned installer identification information, printer model specifying information that specifies a model of the printer 80 to which the printer driver to be downloaded is to be applied (namely, a printer into which the NW installer medium 15 is to be inserted).

Furthermore, there is stored in the ROM 35 a network (NW) installer medium creating program. With the program being executed by the CPU 34, the installer identification information is written into the aforementioned fixed area of the memory card 15 inserted into the slot 16. Thereby, the memory card 15 is converted into the NW installer medium.

In the first embodiment, a format of any kind of memory card is established by emulating a hard disk format compliant with an ANSI (American National Standard Institute) standard. Specifically, as shown in FIG. 4, there are formed in the memory card to configure one partition area a data memory area 308 in which reading, writing, and erasing of stored data can be done on a file-by-file basis, a file management information memory area 307 that stores therein file management information for specifying an occupied area for each data file, vacant area not occupied by any data file, and locations of the above areas in the data memory area 308, and a boot sector adjacent to a head side of the file management information memory area 307. The boot sector 304 is secured as a storage sector for an initial program loader (IPL) for using the partition area as a boot disk. Further, the file management information memory area 307, there are secured a storage sector 305 for a file allocation table (FAT) that stores therein occupied sector numbers of data files in a form associated with file names of the data files, respectively, from a head side thereof, and a storage sector 306 for root directories of the data files. Additionally, in an area including a head sector in the memory card, there is secured a master boot record (MBR) sector 302 that stores therein a master boot program for searching the IPL in the partition area and running the detected IPL, and a partition table which stores partition information in the memory card. Thereby, a widely spread ANSI-compliant standard infrastructure for a hard disk can be applied to the memory cards 11 to 14. Hence, efforts for development of software related to read/write control of the data file can considerably be reduced. The aforementioned installer identification information is written into any of the master boot record sector 302, boot sector 304, and data memory area 308.

FIG. 5 schematically shows a structure of the master boot record sector 302, which is based on the above hard disk format and has areas necessary for boot sequence of an OS as follows. At a head of the master boot record sector 302, there are formed a storage area 302A for the above master boot program and a storage area 302B for the partition table. It is noted that what is indicated by a reference number "302C" is a signature for identifying validity of the master boot record sector 302. Meanwhile, as shown in FIG. 6, there are formed in the boot sector 304, in an order described below, a storage area 304J for a jump code that instructs to jump from a head of the sector to a starting point of the initial program, a storage area 304B for format information in the partition, and a storage area 304A for the boot program (the reference number "304C" is a signature for identifying validity of the boot sector 304).

When a partition area 310 of the memory card 15 is set as a boot drive (i.e., boot disk), in the boot sequence of the OS in the PC 3, firstly, BIOS is read out after the PC 3 has been started up. Subsequently, the master boot record sector 302 is accessed, and the master boot program is executed. Thereby, the IPL is searched in the partition area 310, and the IPL is booted when it is found. The OS is booted with the IPL as a starting point, which operates to read out the OS after hardware checking. However, in the first embodiment, the memory card (NW installer medium) 15 (see FIG. 3) is not employed as a boot disk. Therefore, any of the storage area 302A for the master boot program and storage area 304A for the boot program can be utilized as a vacant area.

The printer 80 downloads the printer driver into the NW installer medium 15 independently (of the host device 3) with the first function (TCP/IP client function). Accordingly, the installer identification information has to be adopted to be read out from the NW installer medium 15 only in a process by the printer 80 without a support of the PC (host device) 3 (e.g., support of a file system that operates on an OS of the PC 3). A concrete method will be described as follows.

Firstly, when the partition area that is not defined as a memory area is not used as the boot disk, as shown in FIG. 5, the installer identification information (and the printer model specifying information) can be written into the vacant area 302A secured as a storage area for the master boot program in the master boot record sector 302 (when the used medium is not required to have a function of a system boot disk, the master boot program is not required to be installed therein). Further, when the partition area is not used as the boot disk, in the boot sector 304 shown in FIG. 6, the IPL is not required to be installed therein. Therefore, the installer identification information (and the printer model specifying information) can be written into the vacant area 304A secured as a storage area for the IPL. In any of the above cases, the printer 80 has to be provided with a means for accessing a sector indicated by a fixed sector number and reading out the installer identification information (and the printer model specifying information). The means is actualized by executing the NW installer medium identification program. A fixed sector (for example, a head sector in the vacant area 302A) is assigned to a sector into which the installer identification information (and the printer model specifying information) is written. Thereby, nonexistence of the master boot program can be confirmed from states of a plurality of bits at a head of the fixed sector (for example, all of the plurality of bits are "0"), and a specified bit following the plurality of bits is used for the installer identification information (for example, the memory card is not the NW installer medium 15 in the case where the specified bit is "0," while the memory card is the NW installer medium 15 in the case where the specified bit is "1").

Meanwhile, as shown in FIG. 4, the installer identification information can be stored in the data memory area 308 in a form included in a data file 400 to which a fixed file name is given. In this case, an occupied sector number for the data file specified by the fixed file name is written into the FAT 307 in a form associated with the fixed file name. The printer 80 is required to have a means for specifying the above fixed file name, searching the occupied sector number of the data file 400 on the FAT, and opening the data file 400 with a dedicated application to read out the installer identification information (and the printer model specifying information). In this case, the aforementioned NW installer medium identification program is established as a program that actualizes the means.

The slot for direct printing (in this case, the slot 16) is also utilized as a slot for downloading the printer driver (into which the NW installer medium 15 is inserted). Accordingly, for example, when a user wishes to make the printer 80 perform direct printing for an image file taken by a digital camera immediately after taking it, the user may want to make the printer 80 perform the direct printing from another medium that stores the image file to be printed while the printer driver is being downloaded into the NW installer medium 15. In recent years, a data size of the printer driver tends to enlarge (for example, 100 to 150 MB in a state of a compressed data file stored in the memory card 11 to 14). For this reason, it may require a long time of 5 to 15 minutes until the download of the printer driver is completed from a start thereof depending on a communication situation. Hence, in the first embodiment, data files including the printer driver are intermittently downloaded from the external server device 9 with a periodic download break. Thereby, even while a printer driver with a large size is being downloaded, since the download break is periodically caused, the NW installer medium 15 can securely be removed from the slot 16 to 19 during a period of the download break.

It is noted that, as shown in FIG. 3, the printer 80 is provided with the access lamp 134 as an indicator for identifying the download break. The user can easily identify whether it is currently in the download break based on a lighting state of the access lamp 134 (for example, a turned-on state thereof represents "currently accessing", while a turned-off state thereof represents "not accessing"). In the first embodiment, as shown in FIG. 2, a direct printing key 93*a* of the menu keys 93, which is provided for displaying a direct printing menu, is formed from transparent resin, and an LED incorporated into the direct printing key 93*a* is used as the access lamp 134. In addition, when the NW installer medium 15 is exchanged for the medium for printing, and the direct printing based on the printing data file stored therein is completed during the period of the download break, the download of the printer driver can be resumed with the medium for printing being removed and the NW installer medium 15 being inserted again.

As shown in FIG. 4, a data file of the printer driver is sectioned into segment files (download-based files) each of which includes a specific amount of data. The printer driver is downloaded with the download break being caused each time a segment file is completely downloaded. On the external server device 9, the printer driver data file is compressed in a state packed in a software-based manner along with the installer program file, and further divided into the above segment files. It is noted that FIG. 4 shows a state immediately after completion of the download (yet, before a below-mentioned file coupling). In addition, there is written in the printer driver data file information on a version of the printer driver.

The segment files are sequentially written into the memory card 15 each time each of them is downloaded. Then, when all of the segment files are completely downloaded, as shown in FIG. 13, operations of coupling the segment files are performed on the memory card 15. Specifically, prior to downloading a plurality of segment files, a management file including information on a list of the segment files is downloaded from the external server device 9 (see FIG. 4). FIG. 12 schematically shows contents of the management file. When the memory card 15 is once removed from the slot 16 before all of the segment files are completely downloaded, and thereafter the memory card 15 is inserted into the slot 16 again, segment files that have not yet been downloaded can easily be specified by comparing already downloaded segment files with the list information included in the management file shown in FIG. 12. Thereby, the download can be resumed for the segment files that have not yet been downloaded. It is noted that a file obtained by coupling all the segment files is, as described above, a self-extracting compressed file in which the printer driver data file and installer program file are packed in the software-based manner (e.g., a ZIP file).

Further, as shown in FIG. 4, a couple of printer driver storage areas 308A and 308B are formed in the memory card (NW installer medium) 15 used for downloading the printer driver to store an old version of already downloaded printer driver and a new version of printer driver to be downloaded from now. When a new version of printer driver (version B in FIG. 4) is completely downloaded, an old version of printer driver (version A in FIG. 4) is erased, and thereafter, a printer driver storage area (the printer driver storage area 308A in FIG. 4) that has stored the old version of printer driver until then is used as a storage area for the latest version of printer driver. Namely, the printer driver storage areas 308A and 308B are alternately used for the latest version of printer driver (one of the printer driver storage areas 308A and 308B is used for a new version of printer driver, while the other is for an old version of printer driver). It is noted that an old version of printer driver is left stored in the memory card 15 as a backup printer driver when it is unsuccessful to download a new version of printer driver. In addition, when information on a version of a printer driver to be downloaded from now is acquired from the external server device 9 and compared with information on a version of a printer driver stored in the memory card 15, it is possible to verify whether the printer driver to be downloaded is of the latest version. When the printer driver to be downloaded is not of the latest version, the download is forbidden.

The printer 80 can perform test printing as a printing process that can be carried out independently of the fist network 410 (namely, the PCs 3). In the first embodiment, by operating a menu key 95*a* for printing maintenance of the menu keys 95 shown in FIG. 2, a printing maintenance menu is displayed on the LCD 21 as shown in FIG. 7. When an option "Test Printing" is selected on the printing maintenance menu by operating the cursor key 92 and the execution key 94 is pressed, the test printing is performed. In the first embodiment, the printer 80 is configured as a color inkjet printer to print each test pattern formed with dashed lines by separately using an ink nozzle for each color, so that the user can visually verify whether the printed result is acceptable (there is any defect such as ink squeezeout).

The test printing is performed on a paper of a A4 size, yet merely in a partial area at an upper side on the paper. Namely, the test printing is performed in an area at a lower side on the paper. In the first embodiment, the printer 80 is configured to concurrently print instruction information on how to use the NW installer medium 15 in the area at the lower side on the paper based on data for printing the instruction information stored in the ROM 35 shown in FIG. 3. The user who has implemented the test printing inevitably sees the instruction information when visually verifying the result of the test printing. Therefore, the user can promptly know a new function of the printer 80 that will download the printer driver therefor using the NW installer medium 15.

Hereinafter, there will be given with reference to flowcharts detailed explanations on how to use the communication system 1 and printer 80 and operation thereof, especially functions thereof according to aspects of the present invention. FIG. 14 is a flowchart showing a procedure of a process of creating the NW installer medium. When the memory card 15 is inserted into the corresponding slot 16, the printer 80 detects the memory card 15 (S101). Then, as shown in FIG. 8, a menu displayed on the LCD 21 is changed to a memory card management menu that includes a menu item "NW installer medium creation" (S102). It is noted that, when the direct printing key 93 is pressed in this state, the displayed menu is switched to a menu related to the direct printing (direct printing menu) from the memory card management menu as shown in FIG. 9.

When the menu item "NW installer medium creation" is selected in the state shown in FIG. 8 (S103: Yes), a screen image for determining whether to convert the memory card 15 into the NW installer medium is displayed as shown in FIG. 10. At this time, there is concurrently displayed a warning message informing that the memory card 15 is converted into the NW installer medium after initialization thereof (S104). Then, it is judged whether "Yes" is selected on the screen image shown in FIG. 10 (S105). When the judgment in the step S105 is affirmative (S105: Yes), the inserted memory card 15 is initialized (S106). In a step S107, the installer identification information is written into the memory card 15, and the process is terminated. It is noted that FIG. 11 is an example of a screen image displayed on the LCD 21 in the converting operation.

FIG. 15 is a flowchart showing a procedure of a process of installing the printer driver into the PC 3. In a step S1, the printer 80, connected with the first network, is set up by configuring setting items for TCP/IP such as the IP address, subnet mask, and gateway. In a step 2, the aforementioned test printing is performed by the printer 80. The user determines a method in which the printer driver is installed with reference to the instruction information printed along with the test printing result in a step 3. When the user wishes the installation of the printer driver from the attached printer driver installation disk 300 (CD-ROM), the process goes to a step S5, in which the printer driver is installed with the printer driver installation disk 300 being inserted into the PC 3. Meanwhile, when the user wishes the installation of the latest printer driver with the NW installer medium 15 as already created, the process goes to a step S4, in which there is performed a process of downloading the latest printer driver into the NW installer medium 15 in the aforementioned method using the TCP/IP client function.

FIG. 16 is a flowchart showing a detailed procedure of the process of downloading the latest printer driver into the NW installer medium 15. In a step S201, a memory card inserted into the slot 16 is detected. In a step S202, it is judged based on the installer identification information stored in the memory card whether the memory card is the NW installer medium 15. When it is judged that the memory card is the NW installer medium 15 (S202: Yes), the process advances to a step S203, in which download of the printer driver along with the installer program from the external server (download site) 9 is started. Meanwhile, when it is not judged that the memory card is the NW installer medium 15 (S202: No), the process is terminated without downloading the printer driver. In a step S204 following the step S203, one of the aforementioned segment files is downloaded. Thereafter, it is judged in a step S205 whether all of the segment files are completely downloaded. When it is not judged that all of the segment files are completely downloaded (S205: No), the process proceeds to a step S206, in which the download break is caused (in this case, 30 seconds). After the download break, it is judged whether the NW installer medium 15 is still inserted in the slot 16 (S207). When it is not judged that the NW installer medium 15 is inserted in the slot 16 (that is, when the NW installer medium 15 has been removed from the slot 16) (S207: No), the process goes to a step S208, in which download of a next segment file is not performed until the NW installer medium 15 is detected again.

In the meantime, when it is judged in the step S207 that the NW installer medium 15 is still inserted in the slot 16 (S207: Yes), the process goes back to the step S204, a next segment file is downloaded. The steps of S204 to S208 are repeated until all of the segment files are completely downloaded. When it is judged in the step S205 that all of the segment files are completely downloaded (S205: Yes), the process goes to a step S209, in which it is judged whether the download of the printer driver is the first downloading operation for the NW installer medium 15 (that is, whether an old printer driver exists in the NW installer medium 15). When it is judged that the download of the printer driver is the first downloading operation for the NW installer medium 15 (S209: Yes), the process goes to a step S211, in which information notifying the user of completion of the download of the printer driver is, for example, printed out (or, it may be displayed on the LCD 21). Meanwhile, when it is not judged that the download of the printer driver is the first downloading operation for the NW installer medium 15 (when old versions of printer driver and installer have already been downloaded) (S209: No), the process goes to a step S210, in which the old versions of printer driver and installer are erased. Thereafter, the process goes to a step S211. It is noted that, when a memory capacity of a memory card used for downloading the printer driver is not enough to store both a new version of printer driver and an old version of printer driver, the new version of printer driver may be downloaded after the old version of printer driver has previously been erased.

Next, there will be explained an example of a process of installing the printer driver into the PC 3 from the NW installer medium 15 with the third function (TCP/IP server function: more specifically in this case, an FTP server function) of the printer 80. Firstly, web browser software (e.g., Internet Explorer (trademark registered)) is started up. Then, when an address designating the FTP server on the printer 80 is inputted on the web browser software, a file laid open on the FTP server is displayed in a view form as shown in FIG. 18. In this case, the file laid open on the FTP server is only the aforementioned self-extracting packed file as downloaded, and there is displayed on a window 600 of the browser an icon 601 of the packed file.

When double-clicking the icon 601 with a mouse, an extracting program for the packed file is run, and there is displayed, as shown in FIG. 19, a dialog box 602 for selecting one of options "Run", "Save", and "Cancel" for the file. When a "Run" button 603 is double-clicked in the case where a file publisher cannot be verified, there is displayed, as shown in FIG. 20, a security warning dialog box 602' for making it sure whether the user really want to run the extracting program. When a "Run" button 603' is clicked, a dialog box 604 for running the extracting program is displayed as shown in FIG. 21. Here, when a "Decompress" button 605 is double-clicked, an extracting (decompressing) process is started so that decompressed files can be generated in a folder in the PC 3 that has previously been designated as a destination storage area therefor.

After the extracting process has been completed, a dialog box 606 for informing of the completed extracting process is displayed as shown in FIG. 22. Here, when a "OK" button 607 is clicked on the dialog box 606, software (e.g., Explorer (trademark registered)) for viewing file directories in the PC 3 is ran, and the decompressed files in the previously designated folder is displayed on a corresponding window 610 (see FIG. 23). Thereafter, by repeating command execution through a button clicking operation in accordance with instructions indicated on sequentially displayed dialog boxes, the printer driver is installed.

Hereinafter, there will be given a detailed explanation on a process in the communication system 1 in a second embodiment. It is noted that the communication system 1 of the second embodiment has the same configuration and operates in the same manner as that of the first embodiment with respect to the features shown in FIGS. 1 to 14. Here, features specific to the second embodiment will be described. In the second embodiment, after the process of creating the NW installer medium shown in FIG. 14, firstly, a memory card inserted into the slot 16 is recognized (this step corresponds to the step S201 in FIG. 6 in the first embodiment). Then, it is judged based on the installer identification information written in the memory card whether the memory card is the NW installer medium 15 (this step corresponds to the step S202 in FIG. 6 in the first embodiment). When it is not judged that the memory card is the NW installer medium 15, the process is terminated without executing steps related to a process of downloading the printer driver. Meanwhile, when it is judged that the memory card is the NW installer medium 15, a process in accordance with a flowchart shown in FIG. 25 is performed.

In a step S301, the model specifying information of the printer 80 is written into the NW installer medium 15. Subsequently, in a step S302, the latest version of printer driver is downloaded into the NW installer medium 15 from the external server (download site) 9.

FIG. 16 is, as described above, the flowchart showing a detailed procedure of the process of downloading the printer driver into the NW installer medium 15. In the second embodiment, the download process in the above step S302 is represented by the steps S203 to S211 in FIG. 16. Since there have already been given above the detailed description about the steps S203 to S211 in FIG. 16, it will be omitted here.

Referring back to FIG. 25, there will be described steps for sending the printer driver to the PCs 3 from the NW installer medium 15 with the FTP server function of the printer 80. Firstly, a command for instructing each of the PCs 3 to send information on a version of the printer driver stored therein is sent along with the printer model specifying information to each of the PCs 3 via the first network 410 (S303). FIG. 26 is a flowchart showing a procedure of a process performed at the side of each of the PCs 3. In a step S401, each of the PCs 3 receives the above command and printer model specifying information. When a printer driver for a printer (printer 80) specified by the printer model specifying information has already been installed in the PC 3, the PC 3 sends the information on a version of the printer driver to the printer 80 in a step S402. When the printer driver for the printer specified by the printer model specifying information does not exist in the PC 3, a status representing that the printer driver does not exist is sent to the printer 80.

Referring back to FIG. 25, in a step S303, the printer 80 receives and acquires the information on the version of the printer driver from each of the PCs 3. As described above, the PC 3 sends the information on the version of the printer driver in response to the command received from the printer 80. However, the PC 3 may voluntarily (for example, periodically) send the information on the version of the printer driver. Then, in a step S304, it is judged whether the printer 80 has acquired the information on the version of the printer driver from each of the PCs 3 (namely, whether the printer 80 has completely confirmed the version of the printer driver in each of the PCs 3, and whether printer drivers in some PCs 3 that are to be updated have completely been updated). When the judgment in the step S304 is negative (S304: No), the process goes to a step S305, in which there are displayed as comparison result information on the LCD 21, as shown in FIG. 27, the latest version of the printer driver downloaded at the side of the printer 80 and the version of the printer driver installed in the PC 3. Further, concurrently, there is also displayed on the LCD 21 a message for confirming whether to update the version of the printer driver in the PC 3.

It is noted that printer driver updating can be performed when the version of the printer driver in the PC 3 is older than that of the latest printer driver downloaded at the side of the printer 80 (S306: Yes). Specifically, any of following methods can be employed for the printer driver updating.

(1) When the version of the printer driver in the PC 3 is not older than that of the latest printer driver downloaded at the side of the printer 80, the comparison result information between both of the printer driver versions is not displayed (naturally, the printer driver updating is not performed).

(2) Regardless of whether the version of the printer driver in the PC 3 is older, the comparison result information is displayed. When the version of the printer driver in the PC 3 is older, there is displayed an input screen image shown in FIG. 27 for confirming whether to update the version of the printer driver in the PC 3. Meanwhile, when the version of the printer driver in the PC 3 is not older, there is not displayed the input screen image shown in FIG. 27

For example, in the case of the above (2), the user determines whether to update the version of the printer driver by an input through the numeric keypad 91 (in this case, "1" for "update the printer driver", or "2" for "not update the printer driver"). Then, when "update the printer driver" is selected, the process goes to a step S307 in FIG. 25, in which the printer driver downloaded into the NW installer medium 15 is sent to intended PCs 3. Then, in a step S308, information regarding the printer driver updating is sent to the intended PCs 3.

Referring to FIG. 26 again, at the side of the PC 3, when the latest printer driver is received in a step S403, the information regarding the printer driver updating is also received in a step S404. At the side of the PC 3, at this time, a message informing that the latest printer driver exists is displayed as shown in FIG. 29. In response to the message, the user judges whether to actually update the printer driver (S405). When "update" is selected on a screen image as shown in FIG. 29 (S405: Yes), the process goes to a step S406, in which the old version of printer driver in the PC 3 is updated with the latest version of printer driver as received. Thereafter, the aforementioned process is repeated for each of the intended PCs 3. As described above, the printer driver updating is performed when the printer driver already installed in the PC 3 is of an older version than the latest printer driver downloaded at the side of the printer 80. Hence, communication load of the first network can drastically be reduced.

In the aforementioned process, each time receiving the information on the version of the printer driver in each of the PCs 3 from each of the PCs 3, the printer 80 compares the above information with the information on the version of the printer driver downloaded thereby, and the printer driver updating is performed as needed. However, the printer 80 may previously acquire only the information on the version of the printer driver in each of the PCs 3 from each of the PCs 3, and thereafter may collectively send the latest printer driver to PCs 3 required for the printer drivers therein being updated with the latest printer driver. In this case, as shown in FIG. 28, it is convenient, if there can be displayed in a view form PCs 3 with respective printer drivers to be updated, and, for example, there is a selectable mode (a number "1" in FIG. 28) in which the printer driver updating can collectively be performed for such PCs 3. In addition, there may be a selectable mode (a number "2" in FIG. 28) in which the printer driver updating can be performed only for previously selected PCs 3 among the PCs 3 with respective printer drivers to be updated. In this case, for example, as shown in FIG. 27, it may sequentially be selectable for each of the previously selected PCs 3 whether to update the printer driver.

Further, instead of the aforementioned process, a process according to a flowchart as shown in FIG. 30 may be performed at the side of the PC 3. In a step S501, the information on the version of the printer driver downloaded at the side of the printer 80 is acquired by the PC 3 from the printer 80. In a step S502, there is performed at the side of the PC 3 comparison between the acquired information and the information on the version of the printer driver already installed therein. Then, in a step S503, it is judged whether the printer driver downloaded at the side of the printer 80 is of a newer version than the printer driver already installed in the PC 3. When the judgment in the step S503 is affirmative (S503: Yes), the process goes to a step S504, in which a message similar to that shown in FIG. 29 is displayed on the PC 3. Meanwhile, when the judgment in the step S503 is negative (S503: No), the process is terminated. In a step S505, it is judged by the user whether to update the printer driver. When the judgment in the step S505 is affirmative, namely, when "update" is selected on the screen image as shown in FIG. 29

(S505: Yes), the process goes to a step S506, in which the PC 3 issues, to the printer 80, a request for sending the downloaded printer driver, and the downloaded printer driver is transmitted to the PC 3 from the printer 80 in response to the request (S506). Thereafter, the printer driver being installed in the PC 3 is updated (S507).

Further, in the printer 80, as shown in FIGS. 2 and 3, there may be provided, separately from the slots 16 to 19 for direct printing, a slot 20 dedicated to download of a printer driver. As shown in FIG. 2, the slot 20 is provided at a side of a back surface of the printer 80 that is not frequently touched in usual use. Also, it is desirable that the NW installer medium 15 is always inserted in the slot 20. In the first embodiment, the slot 20 is closed up by a cover 50 when the NW installer medium 15 is not inserted therein.

In this case, the printer driver data file can collectively be downloaded from the external server device 9 without the download break being intentionally caused at the side of the printer 80. Specifically, it is possible to omit a routine SB (the steps of S204 to S208) surrounded with an alternate long and short dash line in FIG. 16.

In the above configuration, when the download of the printer driver conflicts with the direct printing, both the operations can be performed in parallel. However, it may take an extra time to complete the direct printing due to an influence of the download of the printer driver. In order to solve this problem, when the direct printing with any of the slots 16 to 19 interrupts the download of the printer driver that is currently in execution, the download of the printer driver with the slot 20 may be intermitted so that the direct printing can preferentially be performed, and may be resumed in response to that the direct printing is completed. Thereby, the direct printing can promptly be completed.

It is noted that the download of the printer driver may be intermitted in response to that the first memory card 11 is detected in the slot 16 for the direct printing, or in response to that a command for the direct printing is executed at the side of the printer 80 after the first memory card 11 has been inserted into the slot 16. Further, in order to help the download of the printer driver to be intermitted, as described above, the printer driver data file may be sectioned into download-based segment files. In this case, a discontinuity between the segment files may be utilized as timing when the download of the printer driver is intermitted. Alternatively, the printer driver data file may be sectioned at arbitrary timing each time the download of the printer driver is required to be intermitted.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:
1. A communication system, comprising:
a first network;
a printer connected with the first network;
a host device connected with the first network, the host device being configured to use the printer as a network printer with a printer driver being installed therein;
a router;
a second network connected with the first network via the router; and
an external server device connected with the second network, the external server device being configured as a providing source of a first printer driver for the printer;
wherein the printer includes:
a storing unit;
a downloading unit configured to download, into the storing unit, the first printer driver from the external server device via the first network and the second network, independently of the host device;
a sending unit configured to send the first printer driver stored in the storing unit to the host device via the first network;
a version information acquiring unit configured to acquire, from the host device via the first network, version information on a version of a second printer driver already installed in the host device;
a version comparing unit configured to judge whether a version of the first printer driver stored in the storing unit is newer than the version of the second printer driver acquired from the host device; and
a transmission control unit configured to control the sending unit to send the first printer driver stored in the storing unit to the host device, from which the version acquiring unit has acquired the version information, when the version comparing unit judges that the version of the first printer driver is newer than the version of the second printer driver acquired from the host device and not to send the first printer driver stored in the storing unit to the host device, from which the version acquiring unit has acquired the version information, when the version comparing unit judges that the version of the first printer driver is not newer than the version of the second printer driver acquired from the host device, and
wherein the host device includes a receiving unit configured to receive the first printer driver from the sending unit of the printer;
wherein the printer further includes a model specifying information writing unit configured to write model specifying information for specifying a model of the printer into the storing unit;
wherein the version information acquiring unit is configured to acquire the version information from the host device in which there has been installed the second printer driver corresponding to the printer of the model specified by the model specifying information; and
wherein the version information acquiring unit is configured to acquire the version information by sending a command with the model specifying information to the host device and by receiving from the host device the version information corresponding to the model specifying information.
2. The communication system according to claim 1, wherein the first and second networks are configured as TCP/IP-based networks.

3. The communication system according to claim 1,
wherein the downloading unit is configured to download, as well as the first printer driver, an installer program for installing the first printer driver into the host device, from the external server device,
wherein the storing unit is configured to store the downloaded installer program as well as the first printer driver, and
wherein the communication system further comprises a transmission control unit configured to control the sending unit to send the first printer driver stored in the storing unit to the host device in response to the installer program being run at a side of the host device.

4. The communication system according to claim 3,
wherein the storing unit is configured with a non-volatile memory, at least one memory card slot, and a memory card configured to be inserted into the at least one memory card slot.

5. The communication system according to claim 4,
wherein the printer further includes:
an installer medium creating unit configured to convert the memory card into a network installer medium for storing the first printer driver and installer program by initializing the memory card and writing identification information for identifying the network installer medium into the initialized memory card; and
a download control unit configured to allow the downloading unit to download the first printer driver and installer program into the memory card with the identification information written therein.

6. The communication system according to claim 3,
wherein the external server device includes a data file generating unit configured to generate a data file that includes the first printer driver and installer program and section the generated data file into a plurality of segment files, and
wherein the printer further includes a download control unit configured to control the downloading unit to download the data file segment file by segment file and cause a predetermined time period of download break each time a segment file is completely downloaded by the downloading unit.

7. A printer usable as a network printer by a host device via a first network, comprising:
a storing unit;
a downloading unit configured to download, into the storing unit, a first printer driver from an external server device on a second network connected with the first network, independently of the host device;
a sending unit configured to send the first printer driver stored in the storing unit to the host device via the first network;
a version information acquiring unit configured to acquire, from the host device via the first network, version information on a version of a second printer driver already installed in the host device;
a version comparing unit configured to judge whether a version of the first printer driver is newer than the version of the second printer driver based on the version information acquired from the host device; and
a transmission control unit configured to control the sending unit to send the first printer driver stored in the storing unit to the host device, from which the version acquiring unit has acquired the version information, when the version comparing unit judges that the version of the first printer driver is newer than the version of the second printer driver acquired from the host device and not to send the first printer driver stored in the storing unit to the host device, from which the version acquiring unit has acquired the version information, when the version comparing unit judges that the version of the first printer driver is not newer than the version of the second printer driver acquired from the host device;
wherein the printer further includes a model specifying information writing unit configured to write model specifying information for specifying a model of the printer into the storing unit;
wherein the version information acquiring unit is configured to acquire the version information from the host device in which there has been installed the second printer driver corresponding to the printer of the model specified by the model specifying information; and
wherein the version information acquiring unit is configured to acquire the version information by sending a command with the model specifying information to the host device and by receiving from the host device the version information corresponding to the model specifying information.

8. The printer according to claim 7,
wherein the downloading unit is configured to download, as well as the first printer driver, an installer program for installing the first printer driver into the host device, from the external server device,
wherein the storing unit is configured to store the downloaded installer program as well as the first printer driver, and
wherein the printer further comprises a transmission control unit configured to control the sending unit to send the first printer driver stored in the storing unit to the host device in response to the installer program being run at a side of the host device.

9. The printer according to claim 8,
wherein the storing unit is configured with a non-volatile memory, at least one memory card slot, and a memory card configured to be inserted into the at least one memory card slot.

10. The printer according to claim 9, further comprising:
an installer medium creating unit configured to convert the memory card into a network installer medium for storing the first printer driver and installer program by initializing the memory card and writing identification information for identifying the network installer medium into the initialized memory card; and
a download control unit configured to allow the downloading unit to download the first printer driver and installer program into the memory card with the identification information written therein.

11. The printer according to claim 8,
wherein the downloading unit is configured to download, from the external server device, a data file including the first printer driver and installer program, the data file being sectioned into a plurality of segment files on the external server device, and
wherein the printer further includes a download control unit configured to control the downloading unit to download the data file segment file by segment file and cause a predetermined time period of download break each time a segment file is completely downloaded by the downloading unit.

* * * * *